United States Patent
Sawada et al.

(10) Patent No.: US 9,290,085 B2
(45) Date of Patent: Mar. 22, 2016

(54) SUNROOF APPARATUS

(71) Applicant: AISIN SEIKI KABUSHIKI KAISHA, Kariya-shi, Aichi-ken (JP)

(72) Inventors: Kazuki Sawada, Handa (JP); Shogo Takahara, Ota (JP)

(73) Assignee: Aisin Seiki Kabushiki Kaisha, Kariya-shi, Aichi-ken (JP)

( * ) Notice: Subject to any disclaimer, the term of this patent is extended or adjusted under 35 U.S.C. 154(b) by 0 days.

(21) Appl. No.: 14/631,406

(22) Filed: Feb. 25, 2015

(65) Prior Publication Data

US 2015/0246600 A1 Sep. 3, 2015

(30) Foreign Application Priority Data

Feb. 28, 2014 (JP) ................................ 2014-039759

(51) Int. Cl.
*B60J 7/047* (2006.01)
*B60J 7/043* (2006.01)
*B60J 7/057* (2006.01)

(52) U.S. Cl.
CPC ........... *B60J 7/043* (2013.01); *B60J 7/047* (2013.01); *B60J 7/057* (2013.01)

(58) Field of Classification Search
CPC ............. B60J 7/043; B60J 7/047; B60J 10/12
USPC ................ 296/216.02–216.05, 220.01
See application file for complete search history.

(56) References Cited

U.S. PATENT DOCUMENTS

| 7,125,070 | B2 | 10/2006 | Sawada et al. | |
| 7,252,327 | B2 * | 8/2007 | Sawada | B60J 7/0435 296/216.03 |
| 7,578,550 | B2 * | 8/2009 | Sawada | B60J 7/04 296/216.02 |
| 8,152,229 | B2 | 4/2012 | Horiuchi et al. | |
| 8,177,295 | B2 * | 5/2012 | Chauvin | B60J 7/043 296/220.01 |
| 8,388,053 | B2 | 3/2013 | Kikuchi et al. | |
| 8,807,639 | B2 * | 8/2014 | Sawada | B60J 7/053 296/216.06 |
| 2005/0127719 | A1 * | 6/2005 | Sawada | B60J 7/0435 296/216.03 |

FOREIGN PATENT DOCUMENTS

JP 07266892 A * 10/1995
JP 2005-153803 6/2005

* cited by examiner

*Primary Examiner* — Dennis H Pedder
(74) *Attorney, Agent, or Firm* — Finnegan, Henderson, Farabow, Garrett & Dunner, LLP

(57) ABSTRACT

A sunroof apparatus includes a first panel, a second panel, a guide rail, a driving shoe, a front holding member, a center functional member, a rear functional member, a center link configured to bring the first panel that is in a fully closed state to be raised in a height direction and moving in a rear direction along with the first panel while maintaining the first panel in the raised state in association with a movement of the driving shoe in the rear direction, a rear link thereafter receiving the first panel from the center link to support the first panel in a state where the rear link is raised and moving further in the rear direction along with the first panel while maintaining the first panel in the raised state, the center link of which the movement is stopped after the first panel is received by the rear link.

14 Claims, 14 Drawing Sheets

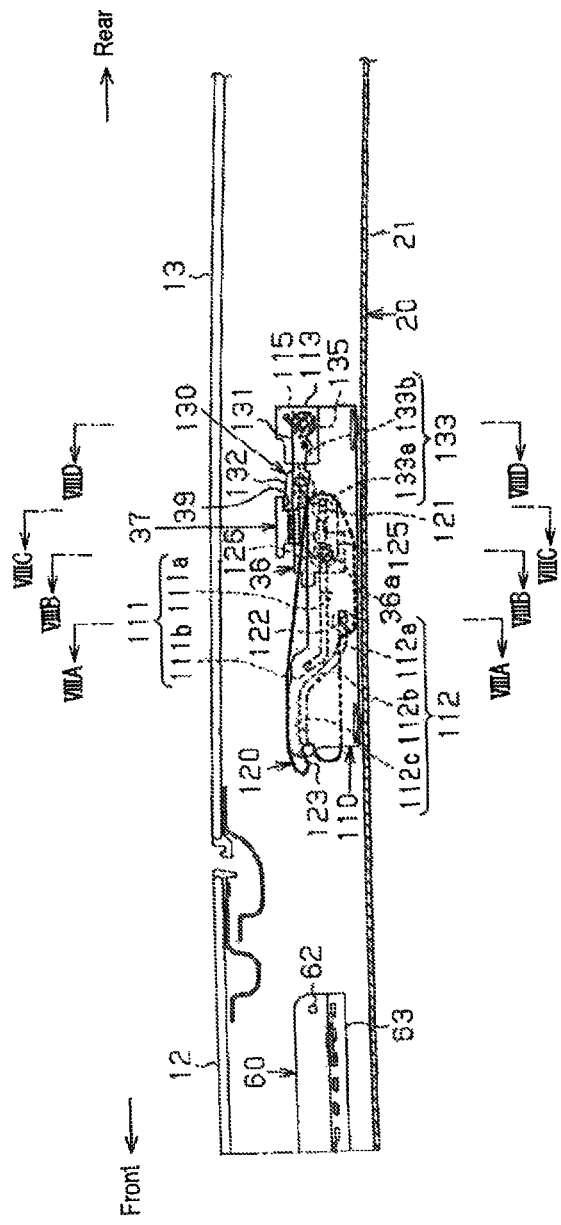

Inner side ←→ Outer side
Width direction

Inner side ←→ Outer side
Width direction

Inner side ←→ Outer side
Width direction

Inner side ←→ Outer side
Width direction

SUNROOF APPARATUS

CROSS REFERENCE TO RELATED APPLICATIONS

This application is based on and claims priority under 35 U.S.C. §119 to Japanese Patent Application 2014-039759, filed on Feb. 28, 2014, the entire content of which is incorporated herein by reference.

TECHNICAL FIELD

This disclosure generally relates to a sunroof apparatus.

BACKGROUND DISCUSSION

A known sunroof apparatus is disclosed, for example, in JP2005-153803A which will be hereinafter referred to as Reference 1. The sunroof apparatus disclosed in Reference 1, which is a so-called outer sliding sunroof, includes a pair of driving shoes disposed to face each other in a front-rear direction of a vehicle in a state where a movable panel is fully closed (i.e., in a fully closed state). The pair of driving shoes moves in a rear direction of the vehicle along a guide rail so that a tip end of a lifting link rotatably connected to the guide rail is lifted up together with a rear end portion of the movable panel to thereby bring the movable panel to a tilt-up state. In a case where the pair of driving shoes moves further rearward along the guide rail while the movable panel is being tilted up (i.e., in the tilt-up state), a front end portion of the movable panel slides on the guide rail in a state where the lifting link is guided by the movable panel. The movable panel moves in the rear direction of the vehicle in a state where the movable panel is tilted up so as to be brought to a fully open state.

According to the sunroof apparatus disclosed in Reference 1, the lifting link is immovable relative to the guide rail in the front-rear direction of the vehicle. Thus, the movement of the movable panel in the rear direction during an opening direction thereof is restricted within a range at the most until the front end portion of the movable panel reaches the lifting link. Thus, an opening amount of the movable panel may be reduced.

In order to secure the opening amount of the movable panel, it is proposed to separately provide an appropriate member at the guide rail. In this case, however, it is desirable to restrain an increase of dimension of the guide rail in a width direction of the vehicle.

A need thus exists for a sunroof apparatus which is not susceptible to the drawback mentioned above.

SUMMARY

According to an aspect of this disclosure, a sunroof apparatus includes a first panel configured to open and close an opening formed at a roof for a vehicle, a second panel arranged at a rear side of the first panel in a front-rear direction of the vehicle, a guide rail arranged at an edge portion of the opening in a width direction of the vehicle and being extended in the front-rear direction of the vehicle, a driving shoe arranged at an inner side portion of the guide rail in the width direction of the vehicle to be movable in the front-rear direction of the vehicle, a front holding member provided at a front end portion of the first panel and arranged at the inner side portion to be movable in the front-rear direction of the vehicle, a center link and a rear link each of which is arranged at an outer side portion of the guide rail in the width direction of the vehicle, and a center functional member and a rear functional member each of which is arranged at the outer side portion of the guide rail to be engageable and disengageable relative to the driving shoe, the center functional member bringing the center link to be raised and lowered in a height direction of the vehicle and to move in the front-rear direction of the vehicle, the rear functional member bringing the rear link to be raised and lowered in the height direction of the vehicle and to move in the front-rear direction of the vehicle. The center link is configured to bring the first panel that is in a fully closed state to be raised in the height direction of the vehicle and moves in a rear direction of the vehicle along with the first panel while maintaining the first panel in the raised state in association with a movement of the driving shoe in the rear direction of the vehicle, the rear link thereafter receiving the first panel from the center link to support the first panel in a state where the rear link is raised and moving further in the rear direction of the vehicle along with the first panel while maintaining the first panel in the raised state, the center link of which the movement in the rear direction is stopped after the first panel is received by the rear link.

BRIEF DESCRIPTION OF THE DRAWINGS

The foregoing and additional features and characteristics of this disclosure will become more apparent from the following detailed description considered with the reference to the accompanying drawings, wherein:

FIG. 5 is a longitudinal section view of the sunroof apparatus in the fully closed state according to the embodiment;

DETAILED DESCRIPTION

An embodiment will be explained with reference to the attached drawings. In the following, a front-rear direction corresponds to a vehicle front-rear direction, and an upper side and a lower side correspond to an upper side and a lower side in a vehicle height direction respectively. Further, a vehicle inner side and a vehicle outer side correspond to an inner side in a vehicle width direction towards a vehicle cabin and an outer side in the vehicle width direction away from the vehicle cabin respectively.

Figure 1:
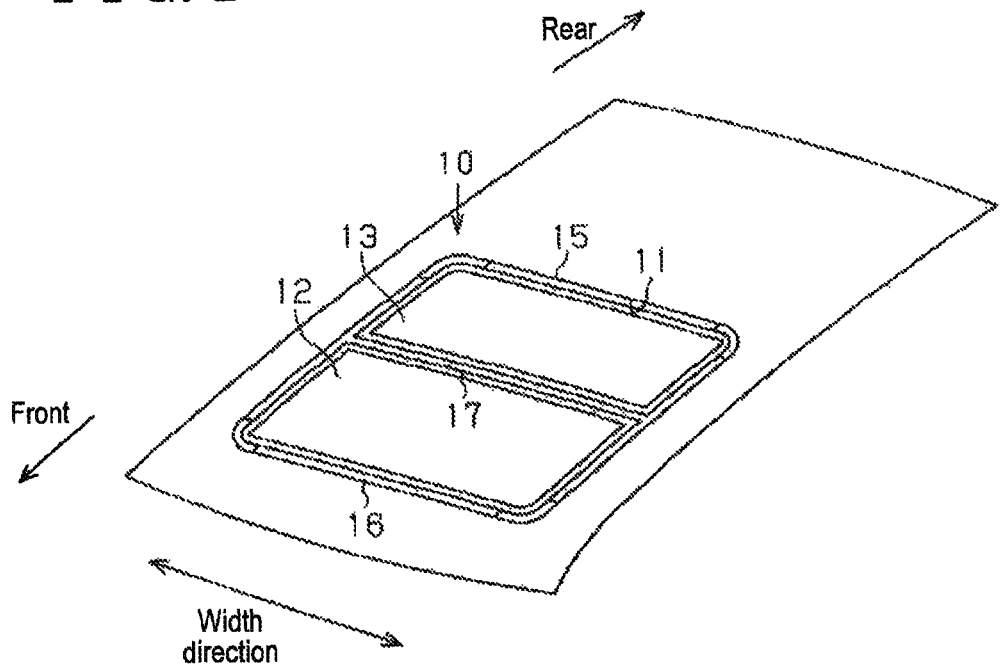
FIG. 1 is a perspective view of a sunroof apparatus in a fully closed state according to an embodiment disclosed here.
Figure 2:
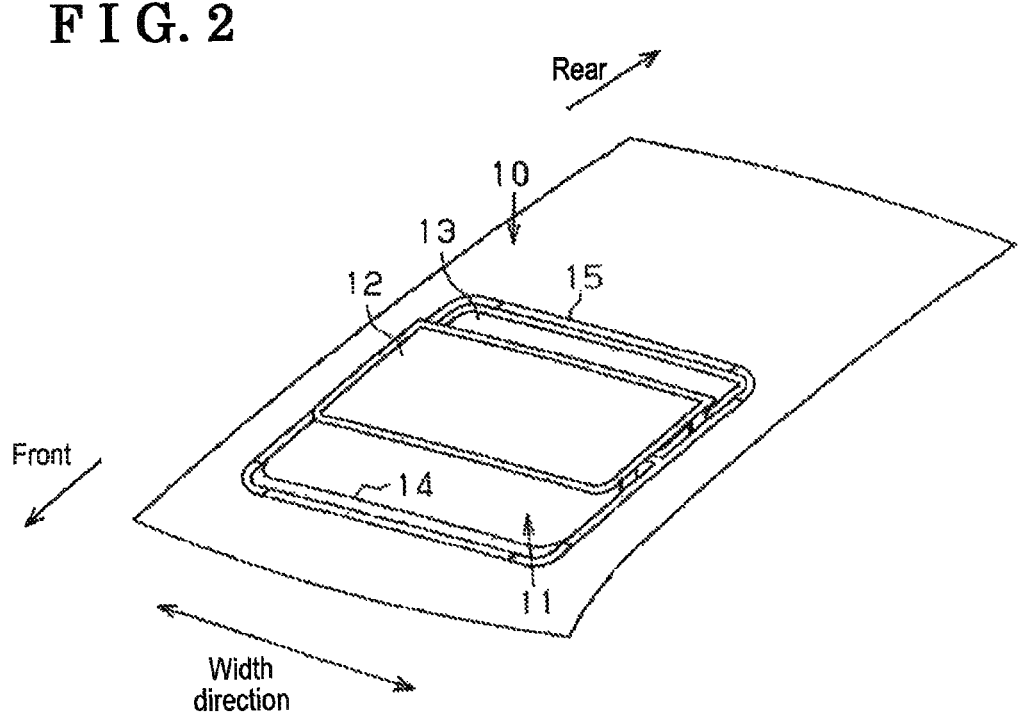
FIG. 2 is a perspective view of the sunroof apparatus in an open state according to the embodiment.

As illustrated in FIGS. 1 and 2, a substantially square or rectangular opening 11 is formed at a roof 10 of a vehicle such as an automobile, for example. In addition, a movable panel 12 serving as a first panel and a fixed panel 13 serving as a second panel are provided at the roof 10. Each of the movable panel 12 and the fixed panel 13 includes a substantially square or rectangular form made of glass plate, for example. The movable panel 12 is mounted no as to selectively open and close a front portion of the opening 11. Specifically, the movable panel 12 is mounted at the roof 10 so as to selectively perform a tilt-up operation in which a rear portion of the movable panel 12 is lifted up or raised with reference to a front portion thereof, a pop-up operation in which the front portion and the rear portion of the movable panel 12 are both lifted up, and a slide operation in which the movable panel 12 slides in the front-rear direction. The sunroof apparatus in the embodiment is a so-called outer sliding sunroof so that the movable panel 12 slides while maintaining the pop-up state during an opening and closing operation of the movable panel 12 for opening and closing the front portion of the opening 11. The fixed panel 13 is mounted to constantly close a rear portion of the opening 11.

A deflector 14 is formed at a front edge of the opening 11 to extend in the vehicle width direction. The deflector 14 is configured to be tilted up so that a front portion of the deflector 14 moves upward with reference to a rear portion thereof. The deflector 14 is released from the movable panel 12 in association with an opening operation of the movable panel 12 and is tilted up so that the deflector 14 is brought to a deployed state in which the deflector 14 protrudes upward from an upper surface of the roof 10. In addition, the deflector 14 is pressed by the movable panel 12 in association with a closing operation of the movable panel 12 so that the deflector 14 is brought to a retracted state in which the deflector 14 is retracted downward from the upper surface of the roof 10. The deflector 14 is brought to the deployed state when the opening 11 is opened so as to inhibit air vibration caused by wind intrusion to the vehicle cabin.

A weather strip 15 is provided at the roof 10. The weather strip 15 integrally includes a body seal portion 16 and a boundary seal portion 17. The body seal portion 16 is formed along a peripheral edge of the opening 11 to include a substantially rectangular annular form. The boundary seal portion 17 in a substantially bar form is formed at a front edge portion of the fixed panel 13 to extend in the width direction thereof in a state where opposed edges of the boundary seal portion 17 in the width direction are connected to the body seal portion 16.

The body seal portion 16 is fluid-tightly in contact with a front edge portion and opposed side edge portions of the movable panel 12 in the vehicle width direction in a state where the movable panel 12 is in the fully closed state, and a rear edge portion and opposed side edge portions of the fixed panel 13 in the vehicle width direction. That is, the body seal portion 16 seals between the peripheral edge of the opening 11 and a peripheral edge of each of the movable panel 12 in the fully closed state and the fixed panel 13. The boundary seal portion 17 is fluid-tightly in contact with a rear edge portion of the movable panel 12 in the fully closed state and the front edge portion of the fixed panel 13. Specifically, the movable panel 12 in the fully closed state and the fixed panel 13 are both fully circumferentially sealed by the single weather strip 15.

Figure 3:
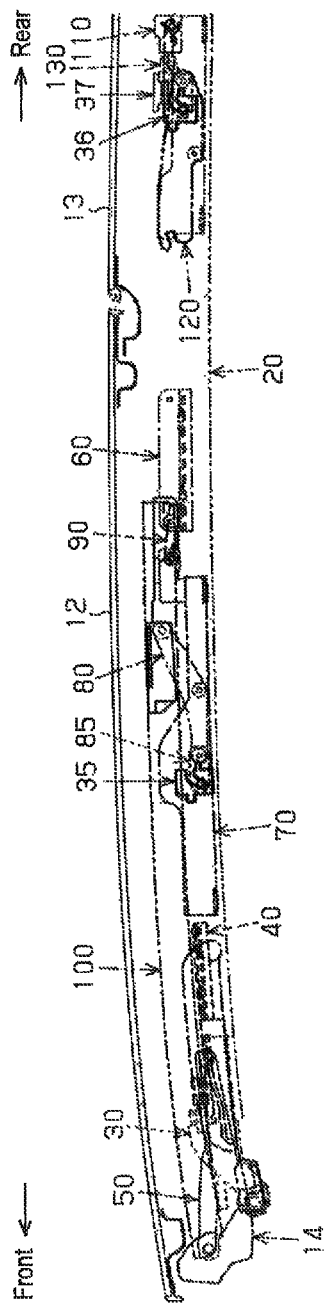
FIG. 3 is a side view of the sunroof apparatus in the fully closed state according to the embodiment.

Next, configurations of the movable panel 12 related to the opening and closing operation thereof, for example, will be explained. Such configurations are basically symmetrical in the vehicle width direction. That is, opposed side portions of the movable panel 12 in the vehicle width direction include substantially the same configurations as each other. Thus, the configurations at one side of the movable panel 12 in the vehicle width direction will be explained below. In FIG. 3, different types of lines illustrate different components for convenience.

Figure 4:
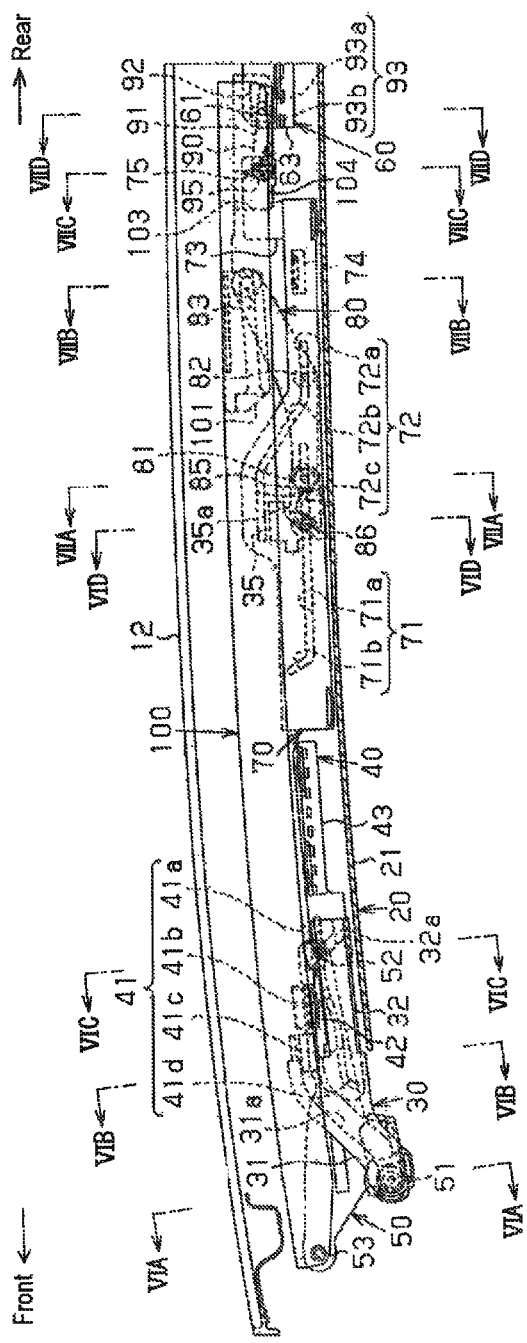
FIG. 4 is a longitudinal section view of the sunroof apparatus in the fully closed state according to the embodiment.
Figure 15:
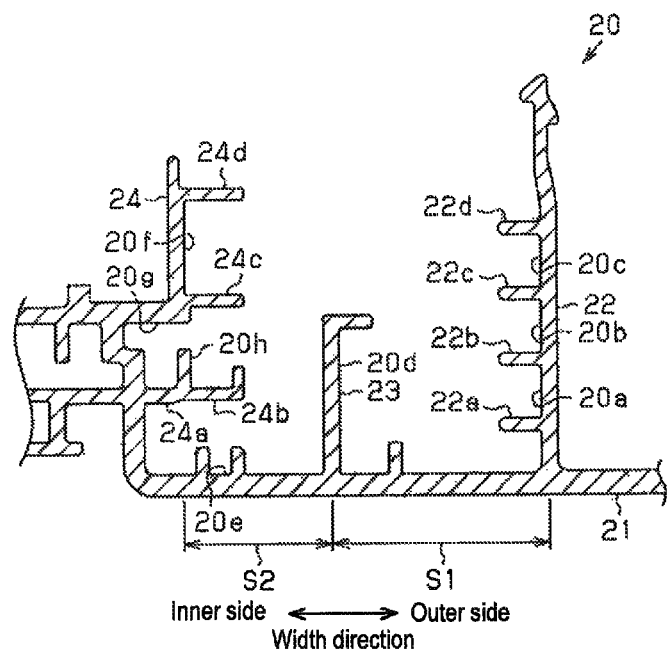
FIG. 15 is a cross-sectional view illustrating a guide rail according to the embodiment.

As illustrated in FIGS. 3 to 5, a guide rail 20 is provided at each edge portion of the opening 11 in the vehicle width direction. The guide rail 20 is made of aluminum alloy extruded material, for example, to extend in the front-rear direction while including a constant cross section in a longitudinal direction of the guide rail 20. Specifically, as illustrated in FIG. 15, the guide rail 20 includes a bottom wall 21 in an elongated form extending in the front-rear direction (i.e., in a direction orthogonal to a paper surface on which FIG. 15 is drawn). The guide rail 20 also includes a vertical wall portion 22 extending upward from the bottom wall 21, a vertical wall portion 23 extending upward from the bottom wall 21 at the vehicle inner side than the vertical wall portion 22, and a vertical wall portion 24 extending upward from the bottom wall 21 at the vehicle inner side than the vertical wall portion 23. The vertical wall portion 24 includes a substantially crank-shaped cross section. In the following, a void formed between the vertical wall portions 22 and 23 at the upper side of the bottom wall 21 is defined to be a vehicle outer side void 51 serving as an outer side portion. A void formed between the vertical wall portions 23 and 24 at the upper side of the bottom wall 21 is defined to be a vehicle inner side void 52 serving as an inner side portion.

The vertical wall portion 22 includes plural guide pieces (in the embodiment, four guide pieces) 22a, 22b, 22c, and 22d disposed to face one another in an up-down direction (vehicle height direction) so as to protrude to the vehicle inner side. Protruding lengths of the guide pieces 22a, 22b, 22c, and 22d to the vehicle inner side are specified to be substantially the same as one another. The guide pieces adjacent to each other in the up-down direction form therebetween a rail portion including a substantially U-shape cross section opening to the vehicle inner side. That is, rail portions 20a, 20b, and 20c are formed between the adjacent guide pieces 22a, 22b, 22c, and 22d respectively.

An upper end of the vertical wall portion 23 is bent to the vehicle outer side so that the vertical wall portion 23 forms a rail portion 20d together with the bottom wall 21. The vertical wall portion 24 includes a support wall portion 24a protruding towards the vehicle outer side from a lower end portion of the vertical wall portion 24 and a support wall portion 24b protruding towards the vehicle outer side from an outer end of the support wall portion 24a at the vehicle outer side. Each of the support wall portions 24a and 24b includes a substantially L-shape cross section. In addition, the vertical wall portion 24 includes a pair of guide pieces 24c and 24d at an upper end portion of the vertical wall portion 24, the upper end section being positioned at the vehicle outer side than the lower end portion. The pair of guide pieces 24c and 24d is disposed to face each other in the up-down direction to protrude towards the vehicle outer side. Protruding lengths of the pair of guide pieces 24c and 24d are specified to be substantially the same as each other. The guide pieces 24c, 24d, and the support wall portion 24b are arranged at equivalent positions in the vehicle width direction. The bottom wall 21 and the vertical wall portion 24 form therebetween a rail portion 20e including a substantially U-shape cross section opening to the vehicle outer side. The guide pieces 24c and 24d adjacent to each other form therebetween a rail portion 20f including a substantially U-shape cross section opening to the vehicle outer side. A rail portion 20g is formed at an upper side of the support wall portion 24a to include a substantially C-shape cross section opening to the vehicle outer side. A rail portion 20h is formed at an upper side of the support wall portion 24b to include a substantially C-shape cross section opening to the vehicle outer side. The rail portions 20g and 20h are in communication with each other in the vehicle width direction.

As illustrated in FIGS. 3 and 4, a front guide block 30 made of resin material, for example, is attached to a front end of the guide rail 20. The front guide block 30 includes a front guide portion 31 positioned forward than the front and of the guide rail 20 and including a substantially sector form, and an attachment portion 32 protruding to a rear side from a rear end of the front guide portion 31 and including a substantially elongated form.

A front guide groove 31a is formed at the front guide portion 1 to be recessed towards the vehicle inner side from a vehicle outer side end. The front guide groove 31a is formed to bend in a substantially arched form extending obliquely upward and rearward. A front end of the front guide groove 31a is closed while a rear end thereof is open. A front link guide groove 32a is formed at the attachment portion 32 to be recessed towards the vehicle inner side from a vehicle outer side end. The front link guide groove 32a is formed to bend in a substantially arched form extending obliquely downward and rearward. An upper end (front end) and a rear end of the front link guide groove 32a are both open.

Figure 6A:
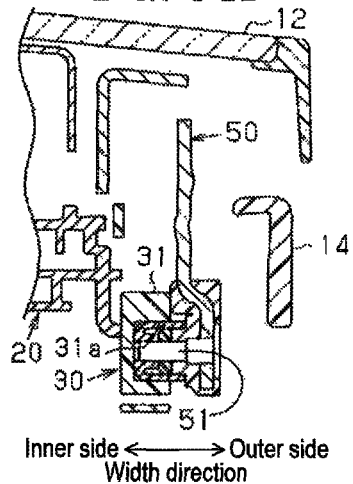
FIGS. 6A, 6B, 6C and 6D are cross-sectional views taken along lines VIA-VIA, VIB-VIB, VIC-VIC, and VID-VID in FIG. 4.
Figure 6B:
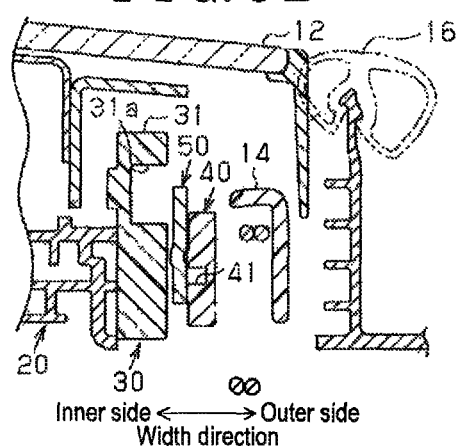
Figure 6C:
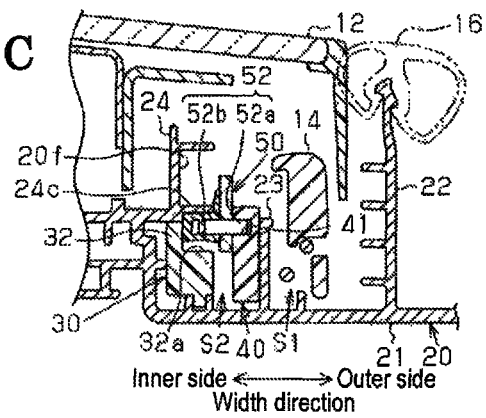

As illustrated in FIGS. 6A and 6B, the front end of the front guide groove 31a is positioned lower than the bottom wall 21 of the guide rail 20. The rear end of the front guide groove 31a is connected to the rail portion 20f. On the other hand, as illustrated in FIG. 6C, the attachment portion 32 is positioned lower than the guide piece 24c at the front end of the guide rail 20 and is fitted onto the bottom wall 21. That is, the attachment portion 32 is fitted to the front end of the guide rail 20 so as to bridge between the rail portions 20e and 20g and the like, by passing through a cut portion formed at front ends of the support wall portions 24a and 24b. The front guide block 30 is disposed at the most vehicle inner side in the vehicle inner side void S2. The upper end of the front link guide groove 32b is open, however, is covered by the guide piece 24c positioned at the upper end of the front link guide groove 32a. The rear end of the front link guide groove 32a is connected to the rail portion 20e.

Figure 6D:
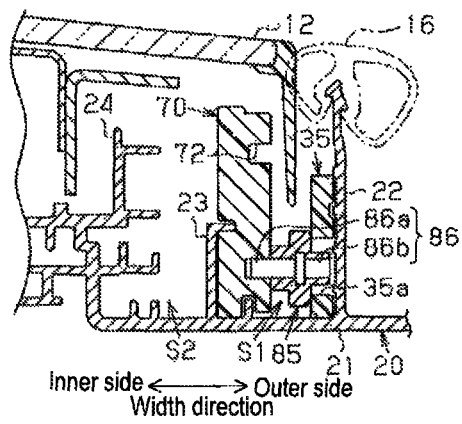

As illustrated in FIGS. 3 and 4, a center guide block 35 made of resin material, for example, and serving as a center fixation block is attached to an intermediate portion of the guide rail 20 in the longitudinal direction thereof at a front side of the fixed panel 13. As also illustrated in FIG. 6D, the center guide block 35 is disposed adjacent to the vertical wall portion 22 at the vehicle inner side thereof. The center guide block 35 is fitted and fixed to the guide rail 20 in a state to bridge among the rail portions 20a, 20b, and 20c on the bottom wall 21 by passing through cut portions formed at the guide pieces 22a, 22b, 22c and 22d. The center guide block 35 is disposed at the most vehicle outer side in the vehicle outer side void S1.

A center link guide groove 35a is formed at the center guide block 35 to penetrate in the vehicle width direction. The center link guide groove 35a is formed in a substantially arched form extending obliquely upward and rearward. A front end of the center link guide groove 35a is closed while a rear end thereof is open. The rear end of the center link guide groove 35a is connected to the rail portion 20b.

Figure 8A:
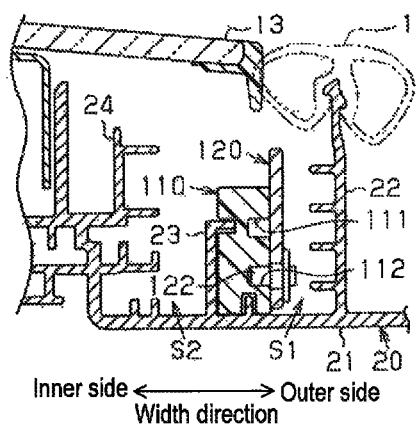
FIGS. 8A, 8B, 8C and 8D are cross-sectional views taken along lines VIIIA-VIIIA, VIIIB-VIIIB, VIIIC-VIIIC, and VIIID-VIIID in FIG. 5.
Figure 8B:
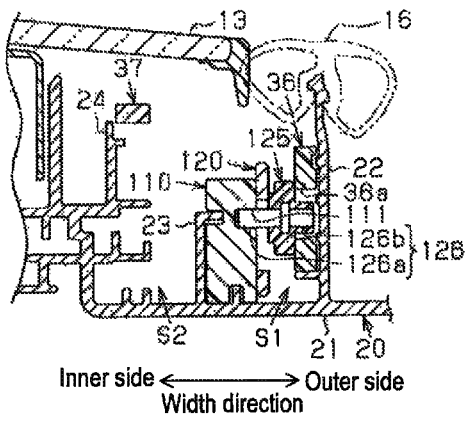

As illustrated in FIGS. 3 and 5, a rear guide block 36 made of resin material, for example, and serving as a rear fixation block is attached to an intermediate portion of the guide rail 20 in the longitudinal direction thereof at a rear side of a front and of the fixed panel 13. As also illustrated in FIG. 8B, the rear guide block 36 is disposed adjacent to the vertical wall portion 22 at the vehicle inner side thereof. The rear guide block 36 is fitted and fixed to the guide rail 20 in a state to bridge between the rail portions 20b and 20c upon the guide piece 22a by passing through out portions formed at the guide pieces 22b, 22c and 22d. The rear guide block 36 is also disposed at the most vehicle outer side in the vehicle outer side void S1.

A rear link guide groove 36a is formed at the rear guide block 36 to penetrate in the vehicle width direction. The rear link guide groove 36a is formed in a substantially arched form extending obliquely upward and rearward. A front end of the rear link guide groove 36a is closed while a rear end thereof is open. The rear end of the rear link guide groove 36a is connected to the rail portion 20c.

Figure 8C:
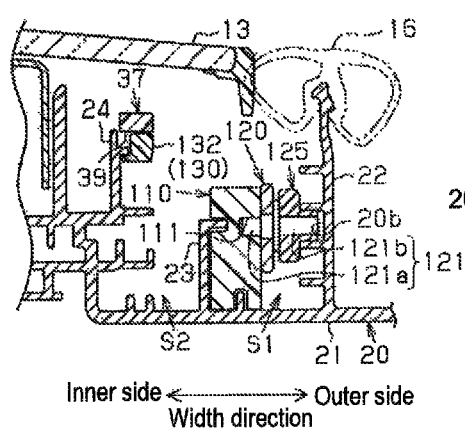
Figure 16:
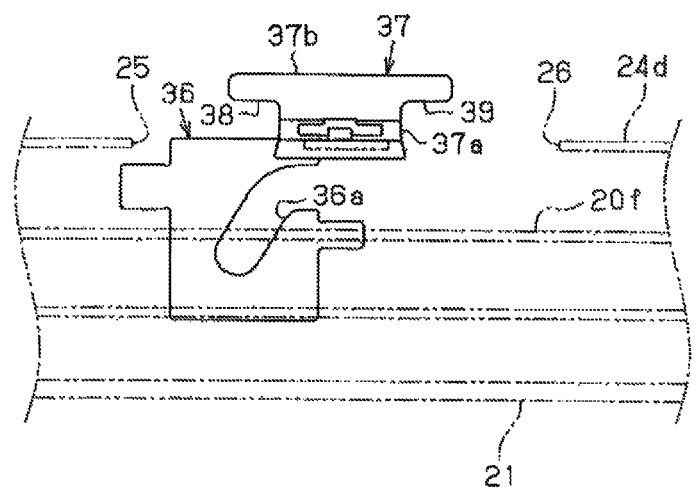
FIG. 16 is a side view illustrating a restriction block and a peripheral configuration thereof according to the embodiment.

As illustrated in FIGS. 3 and 5, a restriction block 37 made of resin material, for example, is attached in the vicinity of the rear guide block 36. Specifically, as illustrated in FIG. 16, a pair of end portions, i.e., front and rear end portions 25 and 26, are formed at the guide piece 24d of the guide rail 20. The restriction block 37 includes a body portion 37a in a substantially block form fitted to a portion (i.e., a cutout portion) sandwiched between the front and rear end portions 25 and 26, and a flange 37b extending in the front-rear direction from an upper end of the body portion 37a positioned at an upper side of the guide piece 24d. A front end surface of the body portion 37a and a lower end surface of the flange 37b connected to the front end surface of the body portion 37a form a center restriction portion 38 operative in cooperation with the front end portion 25. In addition, a rear end surface of the body portion 37a and a lower end surface of the flange 37b connected to the rear end surface of the body portion 37a form a rear restriction portion 39 operative in cooperation with the rear end portion 26. As illustrated in FIGS. 8B and 8C, the restriction block 37 is disposed adjacent to an upper end portion of the vertical wall portion 24 at the vehicle outer side thereof. The restriction block 37 is arranged at the most vehicle inner side at an upper portion in the vehicle inner side void S2.

As illustrated in FIGS. 3 and 4, a front shoe 40 made of resin material, for example, and serving as a front driving shoe is attached to the guide rail 20 so as to be positioned at a rear side of the front guide block 30. The front shoe 40 is supported at the guide rail 20 to be movable in the front-rear direction. The front shoe 40 extends in the front-rear direction so as to be disposed at a lower side of the movable panel 12 in the fully closed state. A guide groove 41 serving as an elongated groove is formed at a front end portion of the front shoe 40 in a manner to be recessed towards the vehicle outer side from a vehicle inner side surface. The guide groove 41 includes a rear longitudinal groove 41a, a rear inclination groove 41b connected to a front end of the rear longitudinal groove 41a to extend obliquely downward and forward, a front longitudinal groove 41c connected to a front end of the rear inclination groove 41b, and a front inclination groove 41d connected to a front end of the front longitudinal groove 41c to extend obliquely downward and forward. The rear longitudinal groove 41a and the front longitudinal groove 41c both extend in the front-rear direction. A rear end of the rear longitudinal groove 41a and a front end of the front inclination groove 41d are both closed.

The front shoe 40 includes a shoe portion 42 extending from an upper end of a front end portion of the front shoe 40 towards the vehicle inner side. A rear end portion of the front shoe 40 forms a shoe portion 43 extending to the vehicle inner side. As illustrated in FIG. 6C, the front shoe 40 is basically disposed adjacent to the vertical wall portion 23 at the vehicle inner side thereof on the bottom wall 21. The front shoe 40 is arranged at the most vehicle outer side in the vehicle inner side void S2. The front shoe 40 is supported at the guide rail 20 to be movable in the front-rear direction in a state where the shoe portion 42 is fitted to the rail portion 20f and the shoe portion 43 is fitted to the rail portion 20h. The front shoe 40 is connected, via the shoe portion 43, to a drive belt that is fitted to the rail portion 20g. The drive belt is driven to move in the front-rear direction along the rail portion 20g by an actuator serving as an electric motor, for example. The front shoe 40 integrally moves with the drive belt in the front-rear direction in association with the movement thereof.

As illustrated in FIGS. 3 and 4, a front link 50 made of metal plate, for example, and serving as a front holding member is supported at the front shoe 40 to be movable in the front-rear direction. The front link 50 extends in the front-rear direction so as to be positioned at the lower side of the movable panel 12 in the fully closed state. The front link 50 includes a front support pin 51 at a lower front and portion and a front engagement pin 52 at a rear end portion. The front support pin 51 protrudes to the vehicle inner side and the front engagement pin 52 protrudes in the vehicle width direction. As illustrated in FIGS. 6A, 6B, and 6C, the front link 50 is basically disposed at the vehicle outer side than the guide piece 24c on the bottom wall 21 and sandwiched between the front guide block 30 and the front shoe 40. The front link 50 is arranged in the vehicle inner side void S2.

The front support pin 51 is inserted to be positioned within the front guide groove 31a of the front guide block 30 in a state where the movable panel 12 is in the fully closed state, for example. The front support pin 51 engages with the front guide groove 31a to be rotatable relative thereto and movable relative thereto in a longitudinal direction of the front guide groove 31a. The front support pin 51 is positioned at a front end of the front guide groove 31a in the fully closed state of the movable panel 12.

Protruding portions of the front engagement pin 52 at the vehicle outer side and the vehicle inner side form a front guide portion 52a and a front restriction portion 52b respectively. The front guide portion 52a is inserted to be positioned within the guide groove 41 of the front shoe 40 in a state to engage with the guide groove 41 to be rotatable relative thereto and movable relative thereto in a longitudinal direction of the guide groove 41. The front guide portion 52a is positioned at the rear longitudinal groove 41a in the fully closed state of the movable panel 12. The front restriction portion 52b is inserted to be positioned within the front link guide groove 32a of the front guide block 30 in the fully closed state of the movable panel 12, for example, in a state to engage with the front link guide groove 32a to be rotatable relative thereto and movable relative thereto in a longitudinal direction of the front link guide groove 32a. The front restriction portion 52b is positioned at a front end of the front link guide groove 32a in the fully closed state of the movable panel 12.

As illustrated in FIGS. 3 to 5, a driving shoe 60 made of resin material into which a metal plate is inserted, for example, is supported at the guide rail 20 so as to be movable in the front-rear direction. Specifically, the driving shoe 60 is positioned at a rear side of the front shoe 40 at the guide rail 20. The driving shoe 60 extends in the front-rear direction so as to be positioned at the lower side of the movable panel 12 in the fully closed state. The driving shoe 60 includes a center engagement pin 61 at an upper front end portion and a rear engagement pin 62 at an upper rear end portion. The center engagement pin 61 and the rear engagement pin 62 protrude to the vehicle inner side. As also illustrated in FIG. 7D, the driving shoe 60 is basically disposed adjacent to the guide pieces 24c and 24d at the vehicle outer side thereof. A lower end portion of the driving shoe 60 forms a shoe portion 63 protruding to the vehicle inner side so as to be fitted to the rail portion 20h. The driving shoe 60 is arranged in the vehicle inner side void S2. The driving shoe 60 is supported, via the shoe portion 63, at the guide rail 20 to be movable in the front-rear direction. The driving shoe 60 is connected, via the shoe portion 63, to the drive belt. Thus, the driving shoe 60 also integrally moves in the front-rear direction with the drive belt in association with the movement thereof. The center engagement pin 61 and the rear engagement pin 62 are both inserted to be positioned within the rail portion 20f.

As illustrated in FIGS. 3 and 4, a center lifting guide 70 made of resin material into which a metal plate is inserted, for example, is supported at the guide rail 20 to be movable in the front-rear direction. The center lifting guide 70 serves as a center raising and lowering member. Specifically, the center lifting guide 70 is positioned at a front side of the restriction block 37 at the guide rail 20. The center lifting guide 70 extends in the front-rear direction so as to be positioned at the lower side of the movable panel 12 in the fully closed state. A first guide groove 71 serving as an elongated groove is formed at a front end portion of the center lifting guide 70 no as to be recessed to the vehicle inner side from a vehicle outer side surface. The first guide groove 71 includes a longitudinal groove portion 71a extending in the front-rear direction and an inclination groove portion 71b connected to a front end of the longitudinal groove portion 51a to extend obliquely upward and forward. A rear end of the longitudinal groove portion 71a and a front end of the inclination groove portion 71b are both closed. In addition, a second guide groove 72 is formed at an intermediate portion of the center lifting guide 70 in the front-rear direction. The second guide groove 72 serving as an elongated groove is recessed to the vehicle inner side from a vehicle outer side surface. The second guide groove 72 includes a rear longitudinal groove portion 72a extending in the front-rear direction, an inclination groove portion 72b connected to a front end of the rear longitudinal groove portion 72a to extend obliquely upward and forward, and a front longitudinal groove portion 72c connected to a front end of the inclination groove portion 72b to extend in the front-rear direction. A center check attachment piece 73 in a substantially L form is formed at the center lifting guide 70 to extend from a rear end thereof in an upper rear direction.

Figure 7A:
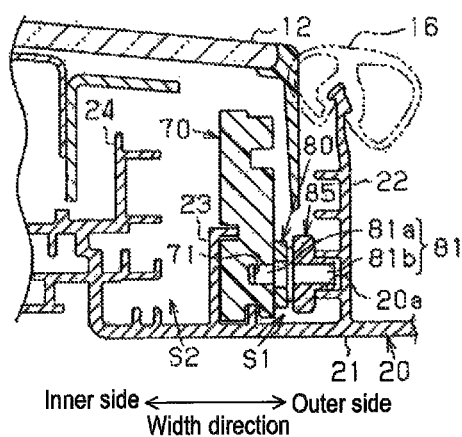
FIGS. 7A, 7B, 7C and 7D are cross-sectional views taken along lines VIIA-VIIA, VIIB-VIIB, VIIC-VIIC, and VIID-VIID in FIG. 4.
Figure 7B:
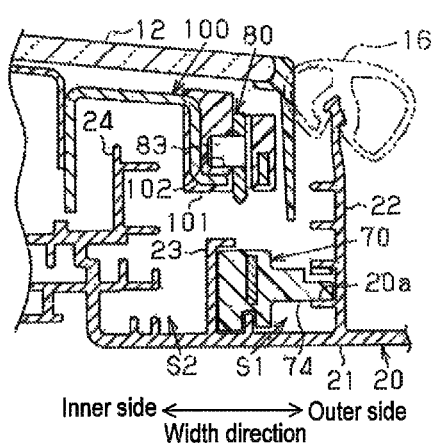
Figure 7C:
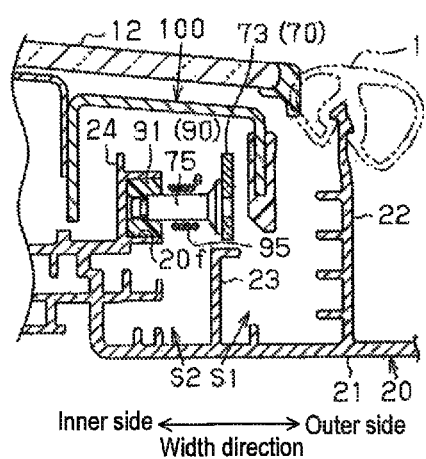
Figure 7D:
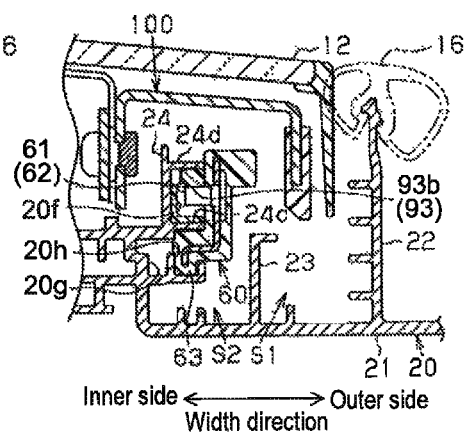

As illustrated in FIGS. 6D and 7A, the center lifting guide 70 is basically disposed adjacent to the vertical wall portion 23 at the vehicle outer side thereof in a state to be supported on the bottom wall 21 to be movable in the front-rear direction. The center lifting guide 70 is arranged at the most vehicle inner side in the vehicle outer side void S1. In addition, as illustrated in FIG. 7B, the center lifting guide 70 includes a shoe portion 74 protruding from an intermediate portion of the center lifting guide 70 in the front-rear direction to the vehicle outer side to be fitted to the rail portion 20a. The center lifting guide 70 is also supported, via the shoe portion 74, at the guide rail 20 to be movable in the front-rear direction. As illustrated in FIG. 7C, an upper end portion of the center check attachment piece 73 is displaced to the vehicle inner side to be positioned immediately above the vertical wall portion 23.

As illustrated in FIGS. 3 and 4, a center link 80 made of metal plate, for example, substantially in an arm form is supported at the center lifting guide 70. The center link 80 extends in the front-rear direction so as to be positioned at the lower side of the movable panel 12 in the fully closed state. The center link 80 includes a first support pin 81 at a front end portion and a second support pin 82 at an intermediate portion in the front-rear direction. The first support pin 81 protrudes in the vehicle width direction while the second support pin 82 protrudes to the vehicle inner side.

As also illustrated in FIG. 7A, the center link 80 is basically disposed adjacent to the center lifting guide 70 at the vehicle outer side thereof in the vehicle width direction. The center link 80 is arranged at the vehicle outer side void S1. Protruding portions of the first support pin 81 at the vehicle inner side and the vehicle outer side form center guide portions 81a and 81b respectively. The center guide portion 81a is inserted to be positioned within the longitudinal groove portion 71a of the center lifting guide 70 in a state to engage with the longitudinal groove portion 71a to be rotatable relative thereto and movable relative thereto in a longitudinal direction of the longitudinal groove portion 71a. The center guide portion 81b is inserted to be positioned within the rail portion 20a of the guide rail 20 in a state to engage with the rail portion 20a to be rotatable relative thereto and movable relative thereto in a longitudinal direction of the rail portion 20a. The second support pin 82 is inserted to be positioned within the second guide groove 72 of the center lifting guide 70 in a state to engage with the second guide groove 72 to be rotatable relative thereto and movable relative thereto in a longitudinal direction of the second guide groove 72. The second support pin 82 is positioned at the rear longitudinal groove portion 72a in the fully closed state of the movable panel 12.

Accordingly, a posture (i.e., direction or orientation) of the center link 80 relative to the center lifting guide 70 and the like is specified by the first and second support pins 81 and 82 inserted to be positioned within the first and second guide grooves 71 and 72. The posture of the center link 80 changes on a basis of the movement of the center lifting guide 70 relative to the center link 80 in the front-rear direction.

As illustrated in FIGS. 3 and 4, a center check link 85 made of metal plate, for example, in a substantially oval form and sewing as a center check member is supported at the center link 80. The center check link 85 constitutes a center functional member along with the center lifting guide 70. The center check link 85 extends in the front-rear direction so as to be positioned at the lower side of the movable panel 12 in the fully closed state. As also illustrated in FIG. 7A, the center check link 85 is basically disposed adjacent to the center link 80 at the vehicle outer side thereof in the vehicle width direction. The center check link 85 is rotatably connected to the center link 80 in a state where the center guide portion 81b of the first support pin 81 is inserted to be positioned within a rear end portion of the center check link 85. The center check link 85 is arranged in the vehicle outer side void S1.

As illustrated in FIG. 6C, the center check link 85 includes a center check pin 86 at a front end portion extending in the vehicle width direction. Protruding portions of the center check pin 86 at the vehicle inner side and the vehicle outer side form center check portions 86a and 86b. The center check portion 86a is inserted to be positioned within the first guide groove 71 of the center lifting guide 70 at a front side of the first support pin 81 in a state to engage with the first guide groove 71 to be rotatable relative thereto and movable relative thereto in a longitudinal direction of the first guide groove 71. The center check portion 86a is positioned at the longitudinal groove portion 71a in the fully closed state of the movable panel 12. The center check portion 86b is positioned at a front end of the center link guide groove 35a of the center guide block 35 in the fully closed state of the movable panel 12, for example. That is, in the fully closed state of the movable panel 12, the center guide portion 81a and the center check portion 86a are both inserted to be positioned within the longitudinal groove portion 71a while the center check portion 86b is inserted to be positioned within the center link guide groove 35a, so that the center check link 85 is restricted from moving in the front-rear direction. In addition, the center link 80 connected to the center check link 85 is restricted from moving in the front-rear direction.

As illustrated in FIGS. 3 and 4, a center check block 90 made of resin material, for example, and serving as a center check member for a driving shoe is rotatably connected, via a center check attachment pin 75, to the center check attachment piece 73 of the center lifting guide 70. The center check block 90 includes a connection portion 91 in a substantially arm form radially extending in the rear direction with reference to the center check attachment pin 75, and a check portion 92 connected to a rear end of the connection portion 91 and elongated relative to the connection portion 91 in the up-down direction. A check groove 93 in a substantially L form is formed at a lower portion of the check portion 92 to be recessed towards the vehicle inner side from a vehicle outer side surface. The check groove 93 includes a longitudinal groove 93a extending in the front-rear direction and an inclination groove 93b connected to a front end of the longitudinal groove 93a to extend obliquely upward and forward. A rear end and a lower end of the longitudinal groove 93a are open while the front end thereof is closed. An upper end of the inclination groove 93b is closed.

As illustrated in FIG. 7C, the center check block 90 is basically fitted to the rail portion 20f to be movable in the front-rear direction. The center check attachment pin 75 extends in the vehicle width direction to bridge over the vehicle inner side void S2. Opposed ends of the center check attachment pin 75 are connected to the center check attachment piece 73 and the connection portion 91. As illustrated in FIG. 7D, in the fully closed state of the movable panel 12, for example, the center engagement pin 61 of the driving shoe 60 is fitted in the inclination groove 93b of the check groove 93. That is, the center check block 90 is restricted, via the inclination groove 93b, from moving in the front-rear direction relative to the center engagement pin 61 so that the center check block 90 is integrally movable with the driving shoe 60 in the front-rear direction. The center lifting guide 70 connected to the center check block 90 is also integrally movable with the driving shoe 60 in the front-rear direction. A center check biasing member 95 formed by a torsion coil spring, for example, is wound around the center check attachment pin 75. Respective ends of the center check biasing member 95 engage with the center check attachment piece 73 and the connection portion 91 to thereby bias the center check block 90 to rotate with reference to the center check attachment pin 75 in a direction where the check portion 92 is lifted up, i.e., in a rotation direction where the check portion 92 makes contact with the guide piece 24d.

As mentioned above, the center restriction portion 38 is formed to be operative by the cooperation between the guide piece 24d (the front end portion 25) and the restriction block 37. Thus, in a case where the center check block 90 that integrally moves with the driving shoe 60 in the rear direction reaches the center restriction portion 38, the check portion 92 that is biased upward by the center check biasing member 95 is fitted into the center restriction portion 38. As a result, the center check block 90 is inhibited from moving in the front-rear direction. At the same time, the longitudinal groove 93a reaches the center engagement pin 61 no that the center engagement pin 61 may enter the rail portion 20f positioned behind the longitudinal groove 93a by passing through the longitudinal groove 93a. The driving shoe 60 is thus movable while the center check block 90 and the like are left behind the driving shoe 60.

On the other hand, in a case where the driving shoe 60 moves in the front direction after moving in the rear direction with the center check block 90, and the like being left behind the driving shoe 60, the center engagement pin 61 enters from the rail portion 20f to the longitudinal groove 93a to reach the inclination groove 93b. Accordingly, the center check block 90 rotates in a direction where the check portion 92 is lowered against a biasing force of the center check biasing member 95 so that the check portion 92 disengages from the center restriction portion 38 to enter the rail portion 20f. The center check block 90 is thus movable in the front-rear direction. At the same time, the center check block 90 is restricted, via the inclination groove 93b, from moving in the front-rear direction relative to the center engagement pin 61 so as to be integrally movable with the driving shoe 60 in the front-rear direction.

As illustrated in FIGS. 3 and 4, the front link 50 includes a front connection pin 53 at a front upper end so that a front end portion of a support bracket 100 made of metal plate, for example, in an elongated form is connected via the front connection pin 53 to the front link 50 to be rotatable relative thereto. The support bracket 100 is fixed to the lower surface of the movable panel 12 to extend in the front-rear direction at an upper side of the guide rail 20. A rear end portion of the support bracket 100 is supported at a rear end portion of the center link 80 in the fully closed state of the movable panel 12, for example. Specifically, a center handover portion 101 is formed at the rear end portion of the support bracket 100. As also illustrated in FIG. 7B, the center handover portion 101 includes a groove form penetrating in the front-rear direction at the upper side of the vertical wall portion 23 positioned at the vehicle inner side than a vehicle outer side edge of the movable panel 12. Specifically, a support groove 102 recessed to the vehicle inner side from an inner wall surface at the vehicle outer side is formed at the center handover portion 101. The rear end portion of the center link 80 is displaced to the vehicle inner side at the upper side of the vertical wall portion 23 and the center connection pin 83 protrudes to the vehicle inner side. The rear end portion of the support bracket 100 is supported at the center link 80 in a state where the rear end portion of the center link 80 is inserted into the center handover portion 101 from a lower side thereof so that the center connection pin 83 is positioned within the support groove 102.

A rear handover portion 103 is formed in the rear of the center handover portion 101 at the support bracket 100. The rear handover portion 103 is formed in a substantially rectangular cylindrical form extending and penetrating in the front-rear direction at a position substantially corresponding to the vehicle outer side edge of the movable panel 12 in the vehicle width direction. A bottom wall of the rear handover portion 103 forms a supported piece 104 as illustrated in FIG. 14C.

As illustrated in FIGS. 3 and 5, a rear lifting guide 110 made of resin material into which a metal plate is inserted, for example, is supported at the guide rail 20 to be movable in the front-rear direction and is positioned at a rear side of the center lifting guide 70. The rear lifting guide 110 serves as a rear raising and lowering member. The rear lifting guide 110 extends in the front-rear direction so as to be positioned at a lower side of the fixed panel 13. A first guide groove 111 serving as an elongated groove is formed at an intermediate portion of the rear lifting guide 110 in the front-rear direction so as to be recessed to the vehicle inner side from a vehicle outer side surface. The first guide groove 111 includes a longitudinal groove portion 111a extending in the front-rear direction and an inclination groove portion 111b connected to a front end of the longitudinal groove portion 111a to extend obliquely upward and forward. A rear end of the longitudinal groove portion 111a and a front end of the inclination groove portion 111b are both closed. In addition, a second guide groove 112 serving as an elongated groove is formed at a front end portion of the rear lifting guide 110 so as to be recessed to the vehicle inner side from a vehicle outer side surface. The second guide groove 112 includes a rear longitudinal groove portion 112a extending in the front-rear direction, an inclination groove portion 112b connected to a front end of the rear longitudinal groove portion 112a to extend obliquely upward and forward, and a front longitudinal groove portion 112c connected to a front end of the inclination groove portion 112b to extend in the front-rear direction. A rear check attachment piece 113 in a substantially rectangular form is formed to extend upward from a rear end of the rear lifting guide 110.

Figure 8D:
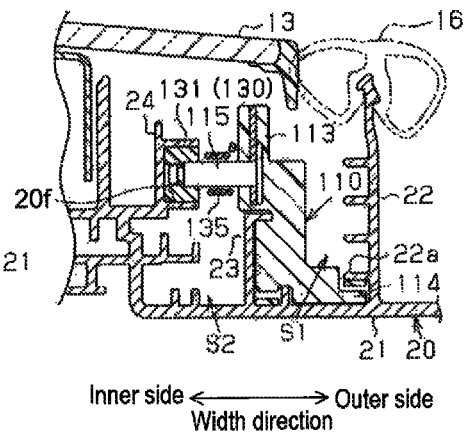

As illustrated in FIGS. 8B and 8C, the rear lifting guide 110 is basically disposed adjacent to the vertical wall portion 23 at the vehicle outer side thereof and is movably supported on the bottom wall 21 in the front-rear direction. The rear lifting guide 110 is arranged at the most vehicle inner side in the vehicle outer side void S1. As illustrated in FIG. 8D, the rear lifting guide 110 includes a shoe portion 114 protruding from a rear end portion of the rear lifting guide 110 to the vehicle outer side to be fitted in between the bottom wall 21 and the guide piece 22a. The rear lifting guide 110 is supported at the guide rail 20 to be movable in the front-rear direction also via the shoe portion 114. The rear check attachment piece 113 is positioned immediately above the vertical wall portion 23.

As illustrated in FIGS. 3 and 5, a rear link 120 made of metal plate, for example, in a substantially arm form is supported at the rear lifting guide 110. The rear link 120 extends in the front-rear direction so as to be positioned at the lower side of the fixed panel 13 in the fully closed state of the movable panel 12. The rear link 120 includes a first support pin 121 at a rear end portion and a second support pin 122 at an intermediate portion in the front-rear direction. The first support pin 121 protrudes in the vehicle width direction and the second support pin 122 protrudes to the vehicle inner side.

As also illustrated in FIG. 8C, the rear link 120 is basically disposed adjacent to the rear lifting guide 110 at the vehicle outer side thereof in the vehicle width direction. The rear link 120 is arranged at the vehicle outer side than a vehicle outer side edge of the fixed panel 13. The rear link 120 is arranged in the vehicle outer side void S1. The rear link 120 is arranged at a position substantially corresponding to the vehicle outer side edge of the movable panel 12 (i.e., where the rear handover portion 103 is disposed) in the vehicle width direction.

The rear link 120 is projectable upward relative to the fixed panel 13 while pressing up the body seal portion 16 as illustrate din FIG. 14C.

Protruding portions of the first support pin 121 at the vehicle inner side and the vehicle outer side form rear guide portions 121a and 121b. The rear guide portion 121a is inserted to be positioned within the longitudinal groove portion 111a of the rear lifting guide 110 in a state to engage with the longitudinal groove portion 111a to be rotatable relative thereto and movable relative thereto in a longitudinal direction of the longitudinal groove portion 111a. The rear guide portion 121b is inserted to be positioned within the rail portion 20b of the guide rail 20 in a state to engage with the rail portion 20b to be rotatable relative thereto and movable relative thereto in a longitudinal direction of the rail portion 20b. As illustrated in FIG. 8A, the second support pin 122 is inserted to be positioned within the second guide Groove 112 of the rear lifting guide 110 in a state to engage with the second guide groove 112 to be rotatable relative thereto and movable relative thereto in a longitudinal direction of the second guide groove 112. The second support pin 122 is positioned at the rear longitudinal groove portion 112a in the fully closed state of the movable panel 12, for example.

Accordingly, a posture (i.e., direction or orientation) of the rear link 120 relative to the rear lifting guide 110 and the like is specified by the first and second support pins 121 and 122 inserted to be positioned within the first and second guide grooves 111 and 112. The posture of the rear link 120 changes on a basis of the movement of the rear lifting guide 110 relative to the rear link 120 in the front-rear direction.

As illustrated in FIG. 5, a support piece 123 in a substantially U-form opening forward is formed at the rear link 120. The support piece 123 supports the rear end portion of the support bracket 100 by sandwiching the supported piece 104 of the rear handover portion 103 in the up-down direction in a fully open state of the movable panel 12, for example, as illustrated in FIG. 14C.

As illustrated in FIG. 5, a rear check link 125 in an oval form made of metal plate, for example, and serving as a rear check member is supported at the rear link 120. The rear check link 125 constitutes a rear functional member along with the rear lifting guide 110. The rear check link 125 extends in the front-rear direction so as to be positioned at the lower side of the fixed panel 13. As also illustrated in FIG. 8C, the rear check link 125 is basically disposed adjacent to the rear link 120 at the vehicle outer side thereof in the vehicle width direction. The rear check link 125 is rotatably connected to the rear link 120 in a state where the rear guide portion 121b of the first support pin 121 is inserted to be positioned at a rear and portion of the rear check link 125. The rear check link 125 is arranged in the vehicle outer side void S1.

As also illustrated in FIG. 8B, the rear check link 125 includes a rear check pin 126 at a front end portion extending in the vehicle width direction. Protruding portions of the rear check pin 126 at the vehicle inner side and the vehicle outer side form rear check portions 126a and 126b respectively. The rear check portion 126a is inserted to be positioned within the first guide groove 111 of the rear lifting guide 110 at a front side of the first support pin 121. The rear check portion 126a engages with the first guide groove 111 to be rotatable relative thereto and movable relative thereto in a longitudinal direction of the first guide groove 111. The rear check portion 126a is positioned at the longitudinal groove portion 111a in the fully closed state of the movable panel 12, for example. The rear check portion 126b is positioned at a front end of the rear link guide groove 36a of the rear guide block 36 in the fully closed state of the movable panel, for example. That is, in the fully closed state of the movable panel 12, for example, the rear guide portion 121a and the rear check portion 126a are both inserted to be positioned within the longitudinal groove portion 111a while the rear check portion 126b is inserted to be positioned within the rear link guide groove 36a. Consequently, the rear check link 125 is restricted from moving in the front-rear direction. The rear link 120 connected to the rear check link 125 is also restricted from moving in the front-rear direction.

As illustrated in FIGS. 3 and 5, a rear check block 130 made of resin material, for example, and serving as a rear check member for a driving shoe is rotatably connected, via a rear check attachment pin 115, to the rear check attachment piece 113 of the rear lifting guide 110. The rear check block 130 constitutes the rear raising and lowering member together with the rear lifting guide 110. The rear check block 130 includes a connection portion 131 in a substantially arm form radially extending in the front direction with reference to the rear check attachment pin 115, and a check portion 132 connected to a front end of the connection portion 131 and elongated relative to the connection portion 131 in the up-down direction. A check groove 133 is formed in a substantially L form at a lower portion of the check portion 132 to be recessed towards the vehicle inner side from a vehicle outer side surface. The check groove 133 includes a longitudinal groove 133a extending in the front-rear direction and an inclination groove 133b connected to a rear end of the longitudinal groove 133a to extend obliquely upward and rearward. A front end and a lower end of the longitudinal groove 133a are open while the rear end thereof is closed. An upper end of the inclination groove 133b is closed.

As illustrated in FIG. 8D, the rear check block 130 is basically fitted to the rail portion 20f to be movable in the front-rear direction. The rear check attachment pin 115 extends in the vehicle width direction to bridge over the vehicle inner side void S2. Opposed ends of the rear check attachment pin 115 are connected to the rear check attachment piece 113 and the connection portion 131. A rear check biasing member 135 formed by a torsion coil spring, for example, is wound around the rear check attachment pin 115. Respective ends of the rear check biasing member 135 engage with the rear check attachment piece 113 and the connection portion 131 to thereby bias the rear check block 130 to rotate with reference to the rear check attachment pin 115 in a direction where the check portion 132 is lifted up.

As mentioned above, the rear restriction portion 39 is formed to be operative by the cooperation between the guide piece 24d (the rear end portion 26) and the restriction block 37. Thus, in the fully closed state of the movable panel 12, for example, the check portion 132 that is biased upward by the rear check biasing member 135 is fitted into the rear restriction portion 39. Accordingly, the rear check block 130 is inhibited from moving in the front-rear direction. At this time, the longitudinal groove 133a is connected to the rail portion 20f at a front side so that the rear engagement pin 62 of the driving shoe 60 moving in the rear direction is configured to enter the longitudinal groove 133a. Thus, in a case where the driving shoe 60 moves rearward, the rear engagement pin 62 enters the longitudinal groove 133a from the rail portion 20f to reach the inclination groove 133b. As a result, the rear check block 130 rotates against a biasing force of the rear check biasing member 135 in a direction where the check portion 132 is lowered. The check portion 132 disengages from the rear restriction portion 39 to enter the rail portion 20f. The rear check block 130 is therefore movable in the front-rear direction. At the same time, the rear check block 130 is restricted, via the inclination groove 133b, from moving in the front-rear direction relative to the rear engagement pin 62 so as to be integrally movable with the driving shoe 60 in the rear direction. The rear lifting guide 110 connected to the rear check block 130 is also integrally movable with the driving shoe 60 in the front-rear direction.

On the other hand, in a case where the rear check block 130 moves forward and reaches the rear restriction portion 39 after integrally moving with the driving shoe 60 rearward, the check portion 132 that is biased upward by the rear check biasing member 135 is fitted in the rear restriction portion 39. Accordingly, the rear check block 130 is inhibited from moving in the front-rear direction. At the same time, the longitudinal groove 133a reaches the rear engagement pin 62 so that the rear engagement pin 62 may enter the rail portion 20f positioned in front of the longitudinal groove 133a by passing therethrough. Consequently, the driving shoe 60 is movable forward while leaving the rear check block 130, and the like.

The operation of the sunroof apparatus according to the embodiment will be explained. In a case where the movable panel 12 is in the fully closed state as illustrated in FIGS. 4 and 5, the front link 50 is restricted from moving in the front-rear direction by the front guide block 30 while the center link 80 is restricted from moving in the front-rear direction by the center guide block 35 and the center check link 85. The center lifting guide 70 is allowed to integrally move with the driving shoe 60 rearward by the center check block 90. In addition, the rear lifting guide 110 is restricted from moving in the front-rear direction by the rear check block 130 while the rear link 120 is restricted from moving in the front-rear direction by the rear guide block 36 and the rear check link 125. The rear check block 130 is positioned away from the driving shoe 60 in the rear direction. Until the driving shoe 60 reaches the rear check block 130, the rear lifting guide 110, and the like maintain the aforementioned states.

Figure 9:
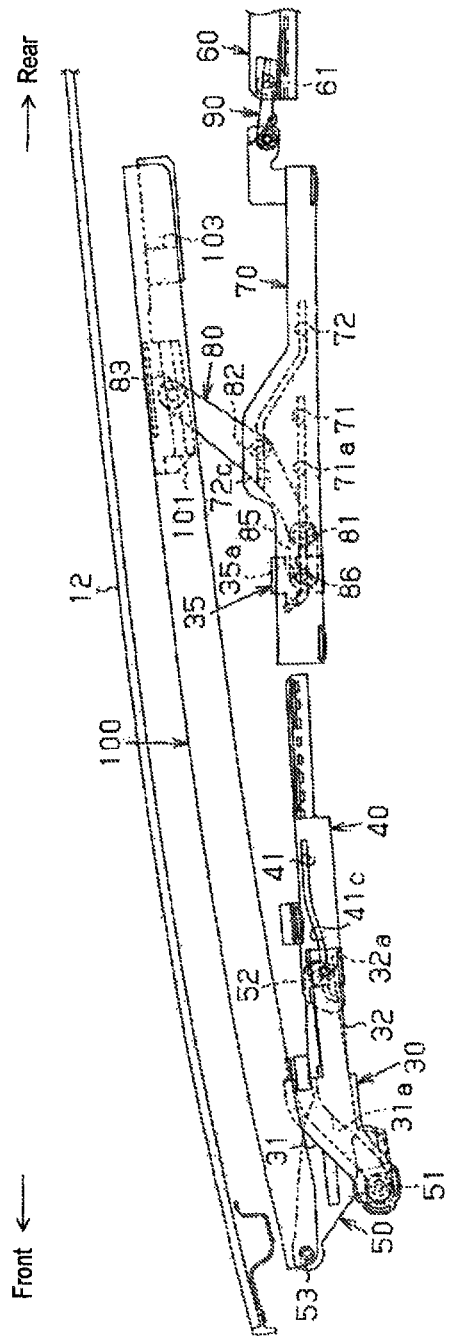
FIG. 9 is a longitudinal section view of the sunroof apparatus in a tilt-up state according to the embodiment.

In a case where the front shoe 40 and the driving shoe 60 integrally move along with the drive belt in the rear direction, the front longitudinal groove portion 72c of the center lifting guide 70 reaches the second support pin 82 of the center link 80 in association with the integral movement of the center lifting guide 70 with the driving shoe 60 and the like in the rearward direction. At this time, as illustrated in FIG. 9, the center link 80 in which the first and second support pins 81 and 82 are guided by the first and second guide grooves 71 and 72 of the center lifting guide 70 rotates with reference to the first support pin 81 in a direction in which the center connection pin 83 is lifted up (i.e., in a counterclockwise direction in FIG. 9). The support bracket 100 rotates with reference to the front connection pin 53 so that the rear end portion of the support bracket 100 is raised along with the movable panel 12. That is, the movable panel 12 is brought to the tilt-up state. At this time, the front end of the longitudinal groove portion 71a reaches the center check pin 86 of the center link 80.

At the same time, in association with the rearward movement of the front shoe 40, the front link 50 of which the front engagement pin 52 is guided by the guide groove 41 rotates with reference to the front support pin 51 in a state where the front longitudinal groove 41c of the front shoe 40 reaches the front engagement pin 52 of the front link 50. At this time, the front engagement pin 52 of the front link 50 reaches an intermediate portion of the front link guide groove 32a of the front guide block 30 in the up-down direction.

Figure 10:
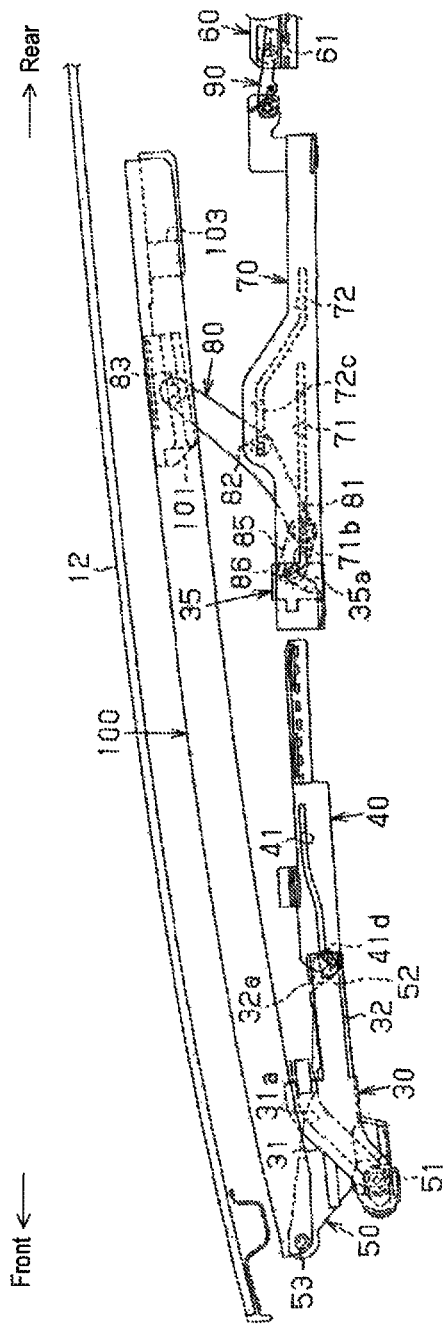
FIG. 10 is a longitudinal section view of the sunroof apparatus chaining from the tilt-up state to a pop-up state according to the embodiment.

In the aforementioned state, in a case where the front shoe 40 and the driving shoe 60 further integrally move rearward, the front end of the inclination groove portion 71b reaches the center check pin 86 of the center check link 85 in association with the integral movement of the center lifting guide 70 with the driving shoe 60 and the like in the rearward direction as illustrated in FIG. 10. At this time, the center check link 85 rotates with reference to the first support pin 81 in a direction in which the center check pin 86 is lifted up (i.e., in a clockwise direction in FIG. 10) in a state where the first support pin 81 and the center check pin 86 are guided by the first guide groove 71. In association with the aforementioned rotation of the center check link 85, the center check pin 86 reaches the rear end of the center link guide groove 35a of the center guide block 35, i.e., reaches the opening end of the center link guide groove 35a. Because the center check pin 86 may enter the rail portion 20b, the center check link 85 together with the center link 80 is movable rearward.

At the same time, in association with the rearward movement of the front shoe 40, the front end of the front inclination groove 41d reaches the front engagement pin 52. The front link 50 in which the front engagement pin 52 is guided by the guide groove 41 further rotates with reference to the front support pin 51. At this time, the front engagement pin 52 reaches the rear end of the front link guide groove 32a, reaches the opening end of the front link guide groove 32a. Because the front engagement pin 52 may enter the rail portion 20e, the front link 50 is movable rearward.

Figure 11:
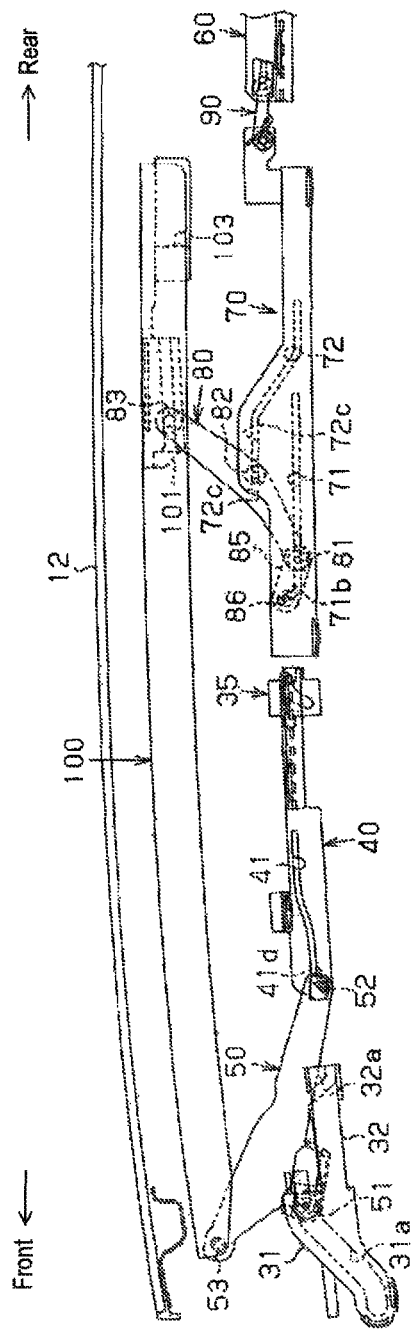
FIG. 11 is a longitudinal section view of the sunroof apparatus in the pop-up state according to the embodiment according to the embodiment.

Next, in a case where the front shoe 40 and the driving shoe 60 further integrally move rearward, as illustrated in FIG. 11, the center check link 85 in which the center check pin 86 is pressed against an inner wall surface of the inclination groove portion 71b (the first guide groove 71) integrally moves rearward with the center link 80 in association with the further rearward movement of the center lifting guide 70.

At the same time, in association with the further rearward movement of the front shoe 40, the front link 50 in which the front engagement pin 52 is pressed against an inner wall surface of the front inclination groove 41d (the guide groove 41) integrally moves rearward with the front shoe 40. At this time, the front link 50 in which the front support pin 51 is guided by the front guide groove 31a rotates with reference to the front engagement pin 52 in a direction where the front connection pin 53 is lifted up (i.e., in a clockwise direction in FIG. 11). The support bracket 100 is entirely lifted up or raised along with the movable panel 12. That is, the movable panel 12 is brought to the pop-up state. At this time, the front support pin 51 reaches the rear end of the front guide groove 31a, i.e., reaches the opening end of the front guide groove 31a. Because the front support pin 51 may enter the rail portion 20f, the front link 50 is movable rearward.

In a case where the front shoe 40 and the driving shoe 60 further integrally move rearward in the aforementioned state, the front link 50 presses the front end portion of the support bracket 100 by the front connection pin 53 while moving rearward to thereby move the support bracket 100 rearward. The center link 80 maintains support of the rear end portion (the center handover portion 101) of the support bracket 100 by the center connection pin 83 while moving rearward. As a result, the movable panel 12 moves rearward while maintaining the pop-up state, i.e., the movable panel 12 is opened (performs the opening operation). In the opening operation of the movable panel 12, the postures of the front link 50 and the center link 80 are maintained substantially constant. Thus, a position at which the front link 50 supports the support bracket 100 (a holding position of the front link 50) and a position at which the center link 80 supports the support bracket 100 (a holding portion of the center link 80) are also maintained substantially constant, i.e., a distance between the holding positions of the front link 50 and the center link 80 in the front-rear direction is also maintained substantially constant.

Figure 12A:
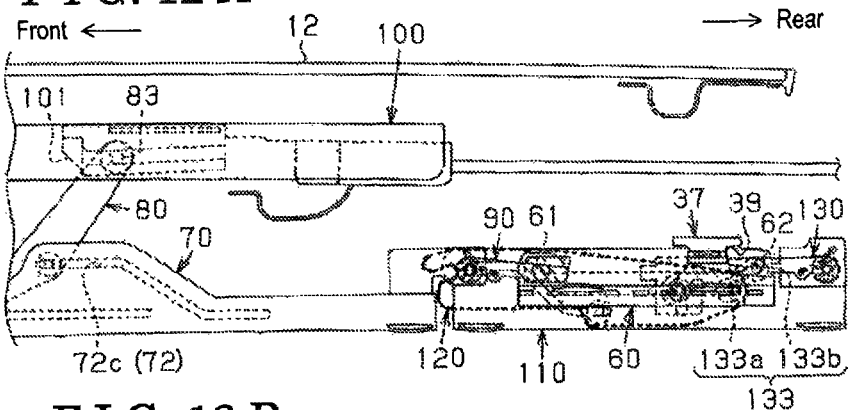
FIGS. 12A, 12B and 12C are longitudinal section views of the sunroof apparatus illustrating operations of a handover of a support of the movable panel from a center link to a rear link according to the embodiment.

As illustrated in FIG. 12A, in association with the integral movement of the front shoe 40 and the driving shoe 60 in the rearward direction, the rear engagement pin 62 of the driving shoe 60 reaches the check groove 133 of the rear check block 130. In this case, the rear engagement pin 62 enters the longitudinal groove 133a from the rail portion 20f to reach the inclination groove 133b so that the rear check block 130 is movable in the front-rear direction and is integrally movable rearward with the driving shoe 60. Thus, in a case where the driving shoe 60 further moves rearward in the aforementioned state, the rear lifting guide 110 moves rearward along with the rear check block 130.

Figure 12B:
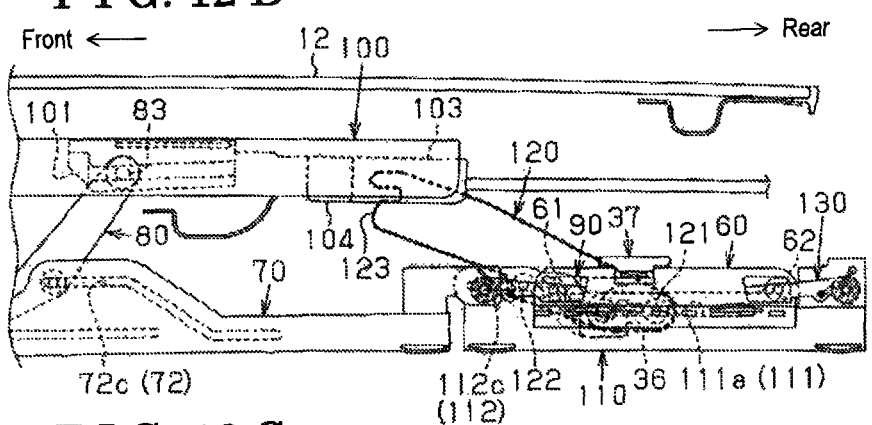

In association with the aforementioned operation, in a case where the front longitudinal groove portion 112c reaches the second support pin 122 as illustrated in FIG. 12B, the rear link 120 in which the first and second support pins 121 and 122 are guided by the first and second guide grooves 111 and 112 rotates with reference to the first support pin 121 in a direction where the support piece 123 is lifted up (i.e., in a clockwise direction in FIG. 12B). Accordingly, the support piece 123 is arranged in the rear of the supported piece 104 of the support bracket 100 that moves rearward along with the front shoe 40, and the like.

Figure 12C:
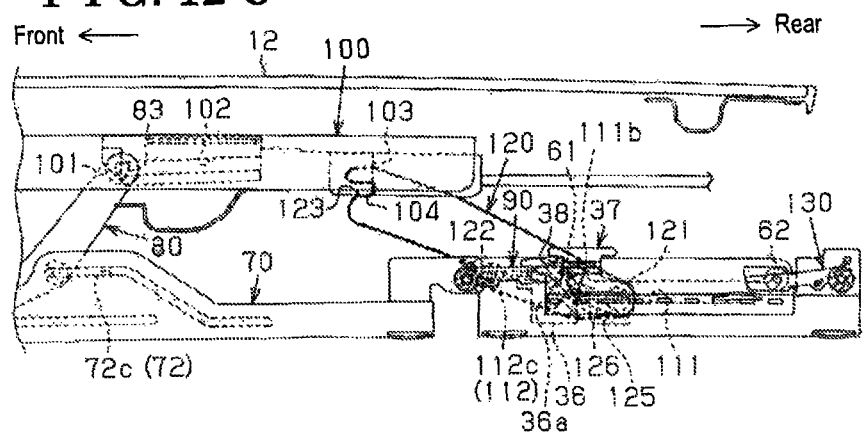

Accordingly, in a case where the support bracket 100 further moves rearward along with the front shoe 40 and the like as illustrated in FIG. 12C, the support piece 123 supports the rear end portion of the support bracket 100 by sandwiching the supported piece 104 in the up-down direction. At this time, the center check block 90 reaches the center restriction portion 38 so that the center check block 90 is inhibited from moving in the front-rear direction and the driving shoe 60 is movable in the rear direction while the center check block 90 and the like are left behind the driving shoe 60. The inclination groove portion 111b reaches the rear check pin 126 of the rear check link 125 so that the rear check link 125 rotates with reference to the first support pin 121 in a direction where the rear check pin 126 is lifted up (i,e., in a clockwise direction in FIG. 12C) in a state where the first support pin 121 and the rear check pin 126 are guided by the first guide groove 111. Then, the rear check in 126 reaches the rear end of the rear link guide groove 36a of the rear guide block 36, i.e., reaches the opening end of the rear link guide groove 36a. Because the rear check pin 126 may enter the rail portion 20c, the rear check link 125 is movable rearward along with the rear link 120.

Figure 13:
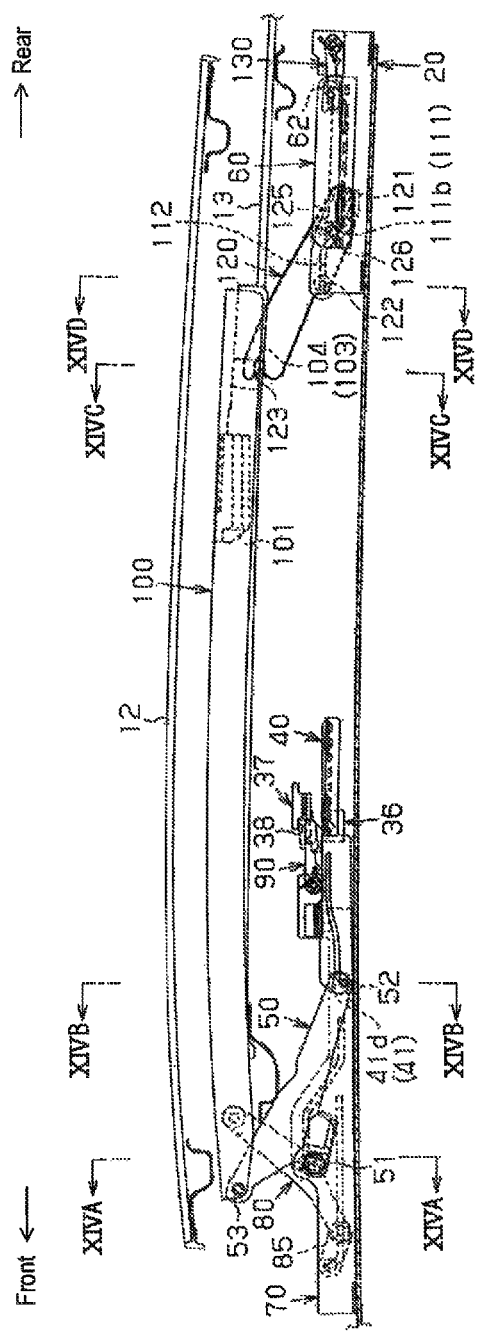
FIG. 13 is a longitudinal section view of the sunroof apparatus in a fully open state according to the embodiment.

In the aforementioned state, in a case where the front shoe 40 and the driving shoe 60 further integrally move rearward, the rear check link 125 in which the rear check pin 126 is pressed against an inner wall surface of the inclination groove portion 111b (the first guide groove 111) integrally moves rearward with the rear link 120 in association with the further rearward movement of the rear lifting guide 110. Thus, the front connection pin 53 of the front link 50 presses the front end portion of the support bracket 100 in association with the rearward movement of the front link 50 to move the support bracket 100 rearward. The rear link 120 maintains support of the rear end portion (the supported piece 104) of the support bracket 100 by the support piece 123 when moving rearward. Accordingly, the movable panel 12 further moves rearward while maintaining the pop-up state, i.e., performs the opening operation. On the other hand, the center connection pin 83 of the center link 80 that is left behind the driving shoe 60 along with the center lifting guide 70 and the like at the position where the center check block 90 is left behind the driving shoe 60 disengages from the support groove 102 in association with the opening operation of the movable panel 12. Thus, the support of the rear end portion of the movable panel 12 (the support bracket 100) is changed over or taken over from the center link 80 to the rear link 120, (i.e., handed over from the center link 80 to the rear link 120). Then, as illustrated in FIG. 13, while the rear end portion of the movable panel 12 is supported by the rear link 120, the movable panel 12 is brought to the fully open state.

Figure 14A:
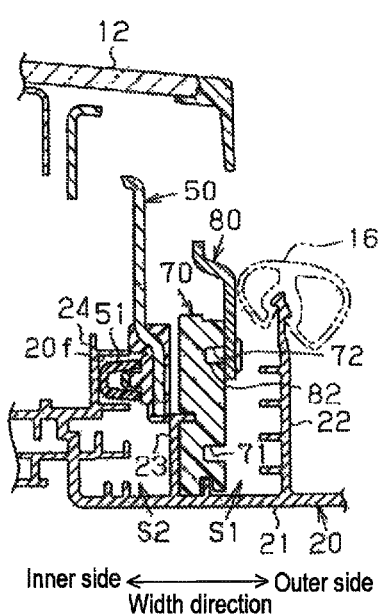
FIGS. 14A, 14B, 14C and 14D are cross-sectional views taken along lines XIVA-XIVA, XIVB-XIVB, XIVC-XIVC and XIVD-XIVD in FIG. 13.
Figure 14B:
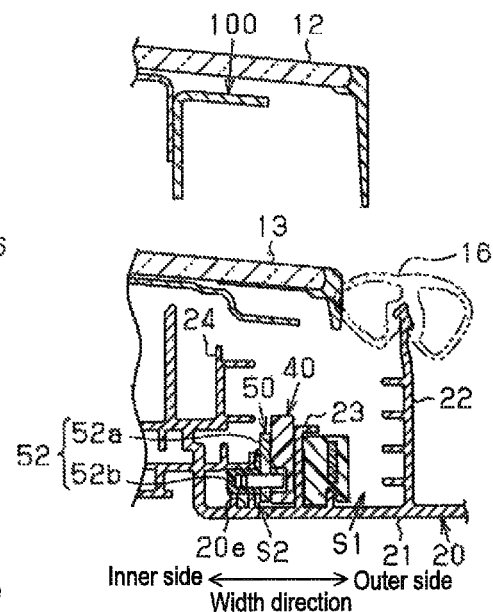
Figure 14C:
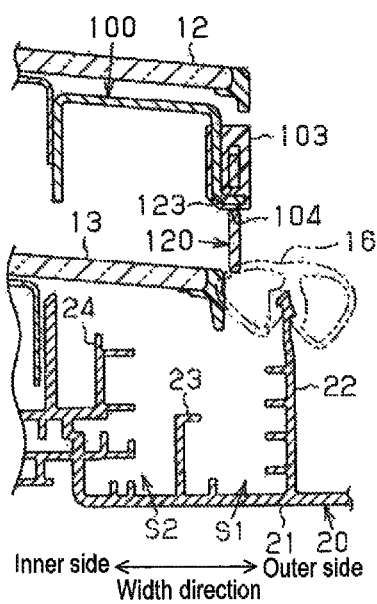
Figure 14D:
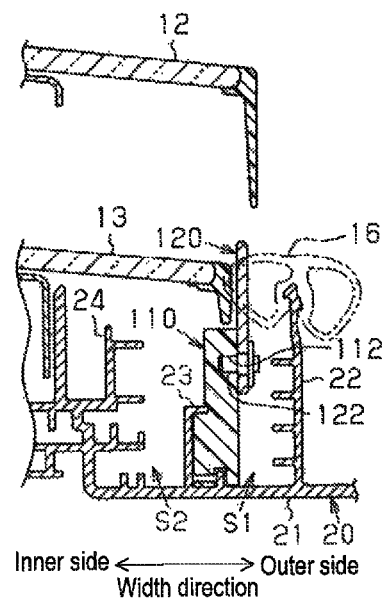

As illustrated in FIG. 14A, it is confirmed that the front support pin 51 that enters the rail portion 20f from the front guide groove 31a of the front guide block 30 is maintained to be positioned at the rail portion 20f until the movable panel 12 is brought to the fully open state. In addition, as illustrated in FIG. 14B, it is confirmed that the front engagement pin 52 (the front restriction portion 52b) that enters the rail portion 20e from the front link guide groove 32a of the front guide block 30 is maintained to be positioned at the rail portion 20e until the movable panel 12 is brought to the fully open state. Further, as illustrated in FIG. 14C, it is confirmed that the support piece 123 of the rear link 120 protruding upward from a void formed between the fixed panel 13 and the vertical wall portion 22 in the width direction sandwiches the supported piece 104 in the up-down direction to thereby support the rear end portion of the support bracket 100. Furthermore, as illustrated in FIG. 14D, it is suggested or indicated that the rear link 120 in which the second support pin 122 is guided by the second guide groove 112 of the rear lifting guide 110 presses up the body seal portion 16 when protruding upward.

The closing operation of the movable panel 12 from the fully open state is performed in reverse order from the aforementioned opening operation. As illustrated in FIG. 13, in a case where the front shoe 40 and the driving shoe 60 integrally move forward in the fully open state of the movable panel 12, the front link 50 where the front engagement pin 52 is pressed against the inner wall surface of the front inclination groove 41d (the guide groove 41) integrally moves forward with the front shoe 40 and the driving shoe 60. In addition, in association with the forward movement of the rear lifting guide 110, the rear check link 126 where the rear check pin 126 is pressed against the inner wall surface of the inclination groove portion 111b (the first guide groove 111) integrally moves forward with the rear link 120. Accordingly, the front link 50 presses the front end portion of the support bracket 100 by the front connection pin 53 when moving forward. The rear link 120 maintains the support of the rear end portion (the supported piece 104) of the support bracket 100 by the support piece 123 when moving forward. The movable panel 12 moves forward while maintaining the pop-up state, i.e., performs the closing operation.

As indicated by changes in FIGS. 12C, 12B and 12A, in a case where the support bracket 100 moves forward along with the front shoe 40, and the like, the center connection pin 83 of the center link 80 that is left behind in the aforementioned manner is inserted to the support groove 102 of the center handover portion 101 to thereby support the rear end portion of the support bracket 100. In addition, the center engagement pin 61 enters the longitudinal groove 93a from the rail portion 20f to reach the inclination groove 93b so that the center check block 90 is movable in the front-rear direction and is integrally movable with the driving shoe 60 in the front direction. Accordingly, the center lifting guide 70 and the like move forward along with the center check block 90.

The rear check link 125 where the rear check pin 126 enters to be positioned within the rear link guide groove 36a rotates with reference to the first support pin 121 in a direction in which the rear check pin 126 is lowered (in a counterclockwise direction in FIGS. 12A to 12C) so that the rear link 120 is inhibited from moving forward together with the rear check link 125. The support piece 123 of the rear link 120 that is left behind together with the rear check link 126 at the position where the rear link 120 and the rear check link 125 are inhibited from moving forward disengages from the supported piece 104. Thus, the support of the rear end portion of the movable panel 12 (the support bracket 100) is changed over from the rear link 120 to the center link 80. Afterwards, the rear link 120 in which the first and second support pins 121 and 122 are guided by the first and second guide grooves 111 and 112 rotates with reference to the first support pin 121 in a direction where the support piece 123 is lowered (in the counterclockwise direction in FIGS. 12A to 12C). The rear check block 130 reaches the rear restriction portion 39 so that the rear check block 130 is inhibited from moving in the front-rear direction and the driving shoe 60 is movable forward while the rear check block 130 and the like are left behind the driving shoe 60.

In the aforementioned state, as indicated by changes in FIGS. 11, 10 and 9, in a case where the front shoe 40 and the driving shoe 60 further integrally move forward, the front link 50 is inhibited from moving forward in a state where the front support pin 51 enters the front guide groove 31a and the front engagement pin 52 enters the front link guide groove 32a. Afterwards, the center check link 85 in which the center check pin 86 enters to be positioned within the center link guide groove 35a rotates with reference to the first support pin 81 in a direction in which the center check pin 86 is lowered (in the counterclockwise direction in FIGS. 9 to 11) so that the center link 80 is inhibited from moving forward together with the center check link 85. As illustrated in FIG. 4, the center link 80 in which the first and second support pins 81 and 82 are guided by the first and second guide grooves 71 and 72 rotates with reference to the first support pin 81 in a direction where the center connection pin 83 is lowered (in the clockwise direction in FIG. 4). The movable panel 12 is brought to the fully closed state accordingly.

According to the embodiment, in a case where the driving shoe 60 moves rearward, the center link 80 brings the movable panel 12 that is in the fully closed state to be raised and moves rearward along with the movable panel 12 while maintaining the raised state of the movable panel 12. The movable panel 12 is thus opened (performs the opening operation). Afterwards, the support of the movable panel 12 is changed over or taken over from the center link 80 to the rear link 120 that is in the raised (lifted up) state, i.e., the center link 80 passes the movable panel to the rear link 120 that is in the raised state and then the movement of the center link 80 in the rear direction is stopped. The rear link 120 that is kept lifted up moves further rearward along with the movable panel 12. Accordingly, the movable panel 12 is further opened to be brought to the fully open state.

The center link 80 stops moving after the support of the movable panel 12 is changed over from the center link 80 to the rear link 120. In this case, because the center link 80 is disposed at the vehicle outer side void S1 of the guide rail 20 together with the center lifting guide 70 and the center check link 85, the front link 50 disposed at the vehicle inner side void 82 and moving rearward along with the movable panel 12 is inhibited from interfering with the center link 80, and the like. The moving amount of the front link 50 may be sufficiently secured to thereby increase the opening amount of the movable panel 12.

In addition, the center lifting guide 70, the center link 80, the center check link 85, the rear lifting guide 110, the rear link 120, and the rear check link 125 are all arranged at the vehicle outer side void S1. Thus, as compared to a case where a group constituted by the center lifting guide 70, the center link 80, and the center check link 85 and a group constituted by the rear lifting guide 110, the rear link 120, and the rear check link 125 are disposed at different positions from each other at the guide rail 20 in the vehicle width direction, the dimension of the guide rail 20 in the vehicle width direction may be further reduced according to the present embodiment.

In a state where the support of the movable panel 12 is changed over or taken over between the center link 80 and the rear link 120, positions of the aforementioned two groups in the front-rear direction are specified not to overlap each other. Specifically, the positions of the center lifting guide 70 and the rear lifting guide 110 in the front-rear direction are specified not to overlap each other, the positions of the center link 80 and the rear link 120 in the front-rear direction are specified not to overlap each other, and the positions of the center check link 85 and the rear check link 125 in the front-rear direction are specified not to overlap each other. Accordingly, when the support of the movable panel 12 is changed over between the center link 80 and the rear link 120, the aforementioned two groups are inhibited from interfering with each other.

In the embodiment, the front end portion of the movable panel 12 (the support bracket 100) is supported at the front link 50 that is movable in the vehicle inner side void S2 of the guide rail 20. For example, if the front end portion of the movable panel 12 is lifted up directly by the front shoe 40 so as to secure a lifting amount of the front end portion of the movable panel 12 during the rearward movement of the movable panel 12, for example, the front shoe 40 is required to include an appropriate height dimension for securing the aforementioned lifting amount. As a result, enlargement of the front shoe 40 in the vehicle height direction may be inevitable. In the embodiment, because the front end portion of the movable panel 12 is lifted up via the front link 50 by the front shoe 40, the front shoe 40 simply includes the height dimension by which the front link 50 is rotatable by a rotation amount for securing the aforementioned lifting amount. The front shoe 40 may be reduced in size in the vehicle height direction accordingly.

Further, in the embodiment, the center lifting guide 70 and the rear lifting guide 110 are disposed at the vehicle inner side relative to the center link 80 and the rear link 120. Thus, in the vehicle outer side void S1, the center lifting guide 70 and the rear lifting guide 110 are inhibited from interfering with the center link 80 and the rear link 120, which may result in effective arrangements.

Furthermore, in the embodiment, the center check link 85 and the rear check link 125 are disposed at the vehicle outer side relative to the center link 80 and the rear link 120, and the center guide block 35 and the rear guide block 36 are disposed at the vehicle outer side relative to the center check link 85 and the rear check link 125. Thus, in the vehicle outer side void S1, the center link 80 and the rear link 120, the center check link 85 and the rear check link 125, and the center guide block 35 and the rear guide block 36 are inhibited from interfering with one another to be effectively arranged one another.

Furthermore, in the embodiment, the center lifting guide 70 and the driving shoe 60 may securely engage and disengage relative to each other by means of the center check block 90. In the same way, the rear lifting guide 110 and the driving shoe 60 may securely engage and disengage relative to each other by means of the rear check block 130.

Furthermore, in the embodiment, the center check block 90 disengages from the driving shoe 60 after the rear check block 130 engages with the driving shoe 60 so that the support of the movable panel 12 is changed over from the center link 80 to the rear link 120 in a state where the lifting (raising) of the rear link 120 is completed. Therefore, it is not necessary to move the driving shoe 60 rearward to raise the rear link 120 after the stop of the movement of the center link 80 such as in a case where the rear check block 130 engages with the driving shoe 60 after the center check block 90 disengages from the driving shoe 60. The moving amount of the driving shoe 60 for bringing the movable panel 12 to the fully open state may be reduced, which may lead to a reduction of the length of the guide rail 20.

Furthermore, in the embodiment, the movable panel 12 is entirely circumferentially sealed by the single weather strip 15 that integrally includes the body seal portion 16 and the boundary seal portion 17. In the same way, the fixed panel 13 is entirely circumferentially sealed by the single weather strip 15. Thus, sealing function may be obtained without interruption over an entire circumference of the movable panel 12 and the fixed panel 13.

The boundary seal portion 17 extending in the vehicle width direction is disposed on the moving locus of the center link 80 in the rear direction. Nevertheless, because the center link 80 is stopped before reaching the boundary seal portion 17 so that the holding of the movable panel 12 is handed over to the rear link 120, the opening operation of the movable panel 12 is not interrupted by the boundary seal portion 17.

Accordingly, the opening amount of the movable panel 12 may increase without deterioration of sealing function. In the embodiment, in a case where each of the front link 50 and the front shoe 40 is disposed at the foremost position while the movable panel 12 is in the fully closed state, the front link 50 and the front shoe 40 are arranged at the vehicle inner side void S2 so that the deflector 14 may be disposed at the vehicle outer side void S1. Specifically, though the deflector 14 is arranged at the vehicle outer side void S1 in the same way as the center lifting guide 70 and the center link 80 (the rear lifting guide 110 and the rear link 120), for example, the deflector 14 is arranged at the front side of the center lifting guide 70 and the center link 80 (the rear lifting guide 110 and the rear link 120) so as to avoid interference therewith.

Furthermore, in the embodiment, the support piece 123 formed at the rear link 120 in a plate form supports the rear end portion of the support bracket 100. Thus, as compared to a case where the rear end portion of the support bracket 100 is supported by a connection pin protruding to the vehicle inner side to follow the center connection pin 83, for example, a portion of the rear link 120 protruding upward from the fixed panel 13 may be reduced in dimension in the width direction. In addition, the dimension of the guide rail 20 in the width direction for achieving the upward protrusion of the rear link 120 from the fixed panel 13 may be reduced.

The embodiment may be changed as follows. The handover (changeover) of the support of the movable panel 12 between the center link 80 and the rear link 120 may be performed to avoid an obstacle other than the boundary seal portion 17. In this case, the weather strip 15 may be configured so that sealing performance is interrupted at respective ends of the boundary seal portion 17.

Further, the handover of the support of the movable panel 12 from the center link 80 to the rear link 120 may be performed after the center link 80 is stopped. In this case, the raising (lifting) of the rear link 120 for achieving the handover of the support of the movable panel 12 may be conducted after the center link 80 is stopped. Specifically, the center check block 90 may disengage from the driving shoe 60 before the rear check block 130 engages with the driving shoe 60.

In the embodiment, the center check link 85 and the rear check link 125 may be disposed at the vehicle inner side relative to the center link 80 and the rear link 120. In addition, the center guide block 35 and the rear guide block 36 may be disposed at the vehicle inner side relative to the center check link 85 and the rear check link 125.

Further, the center lifting guide 70 and the rear lifting guide 110 may be disposed at the vehicle outer side relative to the center link 80 and the rear link 120. The front link 50 may be omitted and a front support pin following the front support pin 51 and serving as the front holding member provided at a position where the front connection pin 53 is provided may be directly supported at the guide rail 20 or the like, for example.

In the embodiment, the front shoe 40 may be disposed at the vehicle outer side void S1. In addition, the front shoe 40 may be integrally formed with the driving shoe 60.

In the embodiment, the fixed panel 13 may be opened and closed (perform the opening and closing operation). In addition, three or more panels may be arranged to face one another in the front-rear direction to be mounted at the roof 10. Then, one of the panels and the other of the panels positioned in the rear of one of the panels may serve as the first panel and the second panel respectively. The second panel may be constantly closed or selectively opened and closed.

In the embodiment, the sunroof apparatus further includes the front shoe 40 arranged at the vehicle inner side void S2 of the guide rail 20 to be movable in the front-rear direction of the vehicle, the front shoe 40 being positioned at a front side of the driving shoe 60 in the front-rear direction of the vehicle. The front holding member is the front link 50 engaging with the front shoe 40 and rotatably connected to the front end portion of the movable panel 12, the front link 50 bringing the front end portion of the movable panel 12 that is in the fully closed state to be raised in the height direction of the vehicle in association with the movement of the front shoe 40 in the rear direction of the vehicle and moving in the rear direction of the vehicle along with the movable panel 12 while maintaining the movable panel 12 in the raised state.

In addition, in the embodiment, the center functional member (the center lifting guide 70 and the center check link 85) and the rear functional member (the rear lifting guide 110 and the rear check link 125) include the center lifting guide 70 and the rear lifting guide 110 respectively, each of the center lifting guide 70 and the rear lifting guide 110 being engageable and disengageable relative to the driving shoe 60. The center link 80 is configured to be raised and lowered in the height direction of the vehicle and to move in the front-rear direction of the vehicle in association with the movement of the center lifting guide 70 in the front-rear direction of the vehicle while the rear link 120 is configured to be raised and lowered in the height direction of the vehicle and to move in the front-rear direction of the vehicle in association with the movement of the rear lifting guide 110 in the front-rear direction of the vehicle. The center lifting guide 70 is disposed at an inner side of the center link 80 in the width direction of the vehicle while the rear lifting guide 110 is disposed at an inner side of the rear link 120 in the width direction of the vehicle.

The sunroof apparatus further includes the center guide block 35 and the rear guide block 36 fixed to the guide rail 20. The center functional member (the center lifting guide 70 and the center check link 85) includes the center check link 85 engaging with the center guide block 35 to allow the center link 80 to be raised and lowered in the height direction of the vehicle and to restrict the center link 80 from moving in the front-rear direction of the vehicle. The rear functional member (the rear lifting guide 110 and the rear check link 125) includes the rear check link 125 engaging with the rear guide block 36 to allow the rear link 120 to be raised and lowered in the height direction of the vehicle and to restrict the rear link 120 from moving in the front-rear direction of the vehicle.

The center check link 85 disengages from the center guide block 35 while being guided by the center lifting guide 70 to allow the center link 80 to move in the front-rear direction of the vehicle and to restrict the center link 80 from being raised and lowered in the height direction of the vehicle. The rear check link 125 disengages from the rear guide block 36 while being guided by the rear lifting guide 110 to allow the rear link 120 to move in the front-rear direction of the vehicle and to restrict the rear link 120 from being raised and lowered in the height direction of the vehicle. The center check link 85 is arranged at an outer side of the center link 80 in the width direction of the vehicle while the rear check link 125 is arranged at an outer side of the rear link 120 in the width direction of the vehicle. The center guide block 35 is arranged at an outer side of the center check link 85 in the width direction of the vehicle while the rear guide block 36 is arranged at an outer side of the rear check link 125 in the width direction of the vehicle.

Further, in the embodiment, the center functional member (the center lifting guide 70 and the center check link 85) and the rear functional member (the rear lifting guide 110 and the rear check link 125) are operatively connected to the center check block 90 and the rear check block 130 respectively, each of the center check block 90 and the rear check block 130 being engageable and disengageable relative to the driving shoe 60.

Further, in the embodiment, the center check block 90 disengages from the driving shoe 60 after the rear check block 130 engages with the driving shoe 60 so that the rear link 120 receives the movable panel 12 from the center link 80 to support the movable panel 12 in a state where the raising of the rear link 120 is completed.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

The invention claimed is:

1. A sunroof apparatus comprising:
    a first panel configured to open and close an opening formed at a roof for a vehicle;
    a second panel arranged at a rear side of the first panel in a front-rear direction of the vehicle;
    a guide rail arranged at an edge portion of the opening in a width direction of the vehicle and being extended in the front-rear direction of the vehicle;
    a driving shoe arranged at an inner side portion of the guide rail in the width direction of the vehicle to be movable in the front-rear direction of the vehicle;
    a front holding member provided at a front end portion of the first panel and arranged at the inner side portion to be movable in the front-rear direction of the vehicle;
    a center link and a rear link each of which is arranged at an outer side portion of the guide rail in the width direction of the vehicle;
    a center functional member and a rear functional member each of which is arranged at the outer side portion of the guide rail to be engageable and disengageable relative to the driving shoe, the center functional member bringing the center link to be raised and lowered in a height direction of the vehicle and to move in the front-rear direction of the vehicle, the rear functional member bringing the rear link to be raised and lowered in the height direction of the vehicle and to move in the front-rear direction of the vehicle; and
    the center link being configured to bring the first panel that is in a fully closed state to be raised in the height direction of the vehicle and moving in a rear direction of the vehicle along with the first panel while maintaining the first panel in the raised state in association with a movement of the driving shoe in the rear direction of the vehicle, the rear link thereafter receiving the first panel from the center link to support the first panel in a state where the rear link is raised and moving further in the rear direction of the vehicle along with the first panel while maintaining the first panel in the raised state, the center link of which the movement in the rear direction is stopped after the first panel is received by the rear link.

2. The sunroof apparatus according to claim 1, further comprising:
    a front driving shoe arranged at the inner side portion of the guide rail to be movable in the front-rear direction of the vehicle, the front driving shoe being positioned at a front side of the driving shoe in the front-rear direction of the vehicle, wherein
    the front holding member is a front link engaging with the front driving shoe and rotatably connected to the front end portion of the first panel, the front link bringing the front end portion of the first panel that is in the fully closed state to be raised in the height direction of the vehicle in association with a movement of the front driving shoe in the rear direction of the vehicle and moving in the rear direction of the vehicle along with the first panel while maintaining the first panel in the raised state.

3. The sunroof apparatus according to claim 1, wherein
    the center functional member and the rear functional member include a center raising and lowering guide and a rear raising and lowering guide respectively, each of the center raising and lowering guide and the rear raising and lowering guide being engageable and disengageable relative to the driving shoe,
    the center link is configured to be raised and lowered in the height direction of the vehicle and to move in the front-rear direction of the vehicle in association with a movement of the center raising and lowering guide in the front-rear direction of the vehicle while the rear link is configured to be raised and lowered in the height direction of the vehicle and to move in the front-rear direction of the vehicle in association with a movement of the rear raising and lowering guide in the front-rear direction of the vehicle, and
    the center raising and lowering guide is disposed at an inner side of the center link in the width direction of the vehicle while the rear raising and lowering guide is disposed at an inner side of the rear link in the width direction of the vehicle.

4. The sunroof apparatus according to claim 2, wherein
    the center functional member and the rear functional member include a center raising and lowering guide and a rear raising and lowering guide respectively, each of the center raising and lowering guide and the rear raising and lowering guide being engageable and disengageable relative to the driving shoe,
    the center link is configured to be raised and lowered in the height direction of the vehicle and to move in the front-rear direction of the vehicle in association with a movement of the center raising and lowering guide in the front-rear direction of the vehicle while the rear link is configured to be raised and lowered in the height direction of the vehicle and to move in the front-rear direction of the vehicle in association with a movement of the rear raising and lowering guide in the front-rear direction of the vehicle, and the center raising and lowering guide is disposed at an inner side of the center link in the width direction of the vehicle while the rear raising and lowering guide is disposed at an inner side of the rear link in the width direction of the vehicle.

5. The sunroof apparatus according to claim 3, further comprising:

a center fixation block and a rear fixation block fixed to the guide rail, wherein the center functional member includes a center check member engaging with the center fixation block to allow the center link to be raised and lowered in the height direction of the vehicle and to restrict the center link from moving in the front-rear direction of the vehicle, the rear functional member includes a rear check member engaging with the rear fixation block to allow the rear link to be raised and lowered in the height direction of the vehicle and to restrict the rear link from moving in the front-rear direction of the vehicle, the center check member disengages from the center fixation block while being guided by the center raising and lowering guide to allow the center link to move in the front-rear direction of the vehicle and to restrict the center link from being raised and lowered in the height direction of the vehicle, the rear check member disengages from the rear fixation block while being guided by the rear raising and lowering guide to allow the rear link to move in the front-rear direction of the vehicle and to restrict the rear link from being raised and lowered in the height direction of the vehicle, the center check member is arranged at an outer side of the center link in the width direction of the vehicle while the rear check member is arranged at an outer side of the rear link in the width direction of the vehicle, and the center fixation block is arranged at an outer side of the center check member in the width direction of the vehicle while the rear fixation block is arranged at an outer side of the rear check member in the width direction of the vehicle.

6. The sunroof apparatus according to claim 4, further comprising:

a center fixation block and a rear fixation block fixed to the guide rail, wherein the center functional member includes a center check member engaging with the center fixation block to allow the center link to be raised and lowered in the height direction of the vehicle and to restrict the center link from moving in the front-rear direction of the vehicle, the rear functional member includes a rear check member engaging with the rear fixation block to allow the rear link to be raised and lowered in the height direction of the vehicle and to restrict the rear link from moving in the front-rear direction of the vehicle, the center check member disengages from the center fixation block while being guided by the center raising and lowering guide to allow the center link to move in the front-rear direction of the vehicle and to restrict the center link from being raised and lowered in the height direction of the vehicle, the rear check member disengages from the rear fixation block while being guided by the rear raising and lowering guide to allow the rear link to move in the front-rear direction of the vehicle and to restrict the rear link from being raised and lowered in the height direction of the vehicle, the center check member is arranged at an outer side of the center link in the width direction of the vehicle while the rear check member is arranged at an outer side of the rear link in the width direction of the vehicle, and the center fixation block is arranged at an outer side of the center check member in the width direction of the vehicle while the rear fixation block is arranged at an outer side of the rear check member in the width direction of the vehicle.

7. The sunroof apparatus according to claim 1, wherein the center functional member and the rear functional member are operatively connected to a center check member for a driving shoe and a rear check member for a driving shoe respectively, each of the center check member for the driving shoe and the rear check member for the driving shoe being engageable and disengageable relative to the driving shoe.

8. The sunroof apparatus according to claim 2, wherein the center functional member and the rear functional member are operatively connected to a center check member for a driving shoe and a rear check member for a driving shoe respectively, each of the center check member for the driving shoe and the rear check member for the driving shoe being engageable and disengageable relative to the driving shoe.

9. The sunroof apparatus according to claim 3, wherein the center functional member and the rear functional member are operatively connected to a center check member for a driving shoe and a rear check member for a driving shoe respectively, each of the center check member for the driving shoe and the rear check member for the driving shoe being engageable and disengageable relative to the driving shoe.

10. The sunroof apparatus according to claim 5, wherein the center functional member and the rear functional member are operatively connected to a center check member for a driving shoe and a rear check member for a driving shoe respectively, each of the center check member for the driving shoe and the rear check member for the driving shoe being engageable and disengageable relative to the driving shoe.

11. The sunroof apparatus according to claim 7, wherein the center check member for the driving shoe disengages from the driving shoe after the rear check member for the driving shoe engages with the driving shoe so that the rear link receives the first panel from the center link to support the first panel in a state where the raising of the rear link is completed.

12. The sunroof apparatus according to claim 8, wherein the center check member for the driving shoe disengages from the driving shoe after the rear check member for the driving shoe engages with the driving shoe so that the rear link receives the first panel from the center link to support the first panel in a state where the raising of the rear link is completed.

13. The sunroof apparatus according to claim 9, wherein the center check member for the driving shoe disengages from the driving shoe after the rear check member for the driving shoe engages with the driving shoe so that the rear link receives the first panel from the center ink to support the first panel in a state where the raising of the rear link is completed.

14. The sunroof apparatus according to claim 10, wherein the center check member for the driving shoe disengages from the driving shoe after the rear check member for the driving shoe engages with the driving shoe so that the rear link receives the first panel from the center link to support the first panel in a state where the raising of the rear link is completed.

* * * * *